US009208334B2

(12) United States Patent
Zhao et al.

(10) Patent No.: US 9,208,334 B2
(45) Date of Patent: Dec. 8, 2015

(54) CONTENT MANAGEMENT USING MULTIPLE ABSTRACTION LAYERS

(71) Applicant: Verance Corporation, San Diego, CA (US)

(72) Inventors: Jian Zhao, San Diego, CA (US); Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 104 days.

(21) Appl. No.: 14/064,010

(22) Filed: Oct. 25, 2013

(65) Prior Publication Data

US 2015/0121534 A1 Apr. 30, 2015

(51) Int. Cl.
*G06F 7/04* (2006.01)
*G06F 17/00* (2006.01)
*G06F 21/62* (2013.01)
*G06F 21/60* (2013.01)

(52) U.S. Cl.
CPC .......... *G06F 21/6209* (2013.01); *G06F 21/604* (2013.01)

(58) Field of Classification Search
CPC ....... H04L 9/3281; H04L 9/32; G06F 9/5072; G06F 7/04
USPC ...................... 726/4, 6, 26, 27; 709/217, 226; 713/156, 168, 176; 380/201, 229, 233, 380/260
See application file for complete search history.

(56) References Cited

U.S. PATENT DOCUMENTS

| 3,406,344 | A | 10/1968 | Hopper |
| 3,842,196 | A | 10/1974 | Loughlin |
| 3,885,217 | A | 5/1975 | Cintron |
| 3,894,190 | A | 7/1975 | Gassmann |

(Continued)

FOREIGN PATENT DOCUMENTS

| CA | 2276638 | 1/2000 |
| CN | 1447269 | 10/2003 |

(Continued)

OTHER PUBLICATIONS

"Advanced Access Content System (AACS), Pre-recorded Video Book," Revision 0.951, Sep. 2009 (86 pages).

(Continued)

*Primary Examiner* — Abu Sholeman
(74) *Attorney, Agent, or Firm* — Perkins Coie LLP; Donald L. Wenskay

(57) ABSTRACT

Systems, devices, methods and computer program products improve various aspects of a content management system. In one scenario, one or more contents are accessed at a content handling device. The content handling device is configured to operate using multiple abstraction layers including an application layer, an operating system layer, a firmware layer and a hardware layer. Content management operations are conducted on the one or more contents using at least two abstraction layers. Such content management operations include conducting watermark extraction and content screening operations at a first layer for a first watermark message having a first value, conducting watermark extraction and content screening operations at a second layer for a second watermark message having a second value, and initiating one or more enforcement actions corresponding to the first value and the second value based at least in-part on respective results of the content screening.

55 Claims, 6 Drawing Sheets

(56) References Cited

U.S. PATENT DOCUMENTS

| | | |
|---|---|---|
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |

(56) References Cited

U.S. PATENT DOCUMENTS

| | | |
|---|---|---|
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,442,285 B2 | 8/2002 | Rhoads et al. |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,535,617 B1 | 3/2003 | Hannigan et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Weber et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,405 B1 | 6/2004 | Muratani et al. |
| 6,757,908 B1 | 6/2004 | Vogel |
| 6,760,463 B2 | 7/2004 | Rhoads |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,810,527 B1 | 10/2004 | Conrad et al. |
| 6,823,455 B1 | 11/2004 | Macy et al. |
| 6,829,368 B2 | 12/2004 | Meyer et al. |
| 6,829,582 B1 | 12/2004 | Barsness |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,571 B1 | 9/2005 | Rhoads et al. |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |

(56) References Cited

U.S. PATENT DOCUMENTS

| | | |
|---|---|---|
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,123,718 B1 | 10/2006 | Moskowitz et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,560 B2 | 1/2007 | Yu |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,369,678 B2 | 5/2008 | Rhoads |
| 7,389,421 B2 | 6/2008 | Kirovski et al. |
| 7,409,073 B2 | 8/2008 | Moskowitz et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,756,272 B2 | 7/2010 | Kocher et al. |
| 7,788,684 B2 | 8/2010 | Petrovic et al. |
| 7,788,693 B2 | 8/2010 | Robbins |
| 7,797,637 B2 * | 9/2010 | Marcjan .................. 715/764 |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,005,258 B2 | 8/2011 | Petrovic et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,106,744 B2 | 1/2012 | Petrovic et al. |
| 8,106,745 B2 | 1/2012 | Petrovic et al. |
| 8,138,930 B1 | 3/2012 | Heath |
| 8,151,113 B2 | 4/2012 | Rhoads |
| 8,155,463 B2 | 4/2012 | Wong et al. |
| 8,181,262 B2 * | 5/2012 | Cooper et al. .................. 726/28 |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,938 B2 | 9/2012 | Petrovic et al. |
| 8,301,893 B2 | 10/2012 | Brundage |
| 8,315,835 B2 | 11/2012 | Tian et al. |
| 8,346,532 B2 | 1/2013 | Chakra et al. |
| 8,346,567 B2 | 1/2013 | Petrovic et al. |
| 8,451,086 B2 | 5/2013 | Petrovic et al. |
| 8,467,717 B2 | 6/2013 | Croy et al. |
| 8,538,066 B2 | 9/2013 | Petrovic et al. |
| 8,588,459 B2 * | 11/2013 | Bloom et al. .................. 382/100 |
| 8,589,969 B2 | 11/2013 | Falcon |
| 8,681,978 B2 | 3/2014 | Petrovic et al. |
| 8,791,789 B2 | 7/2014 | Petrovic et al. |
| 2001/0001159 A1 | 5/2001 | Ford |
| 2001/0021926 A1 | 9/2001 | Schneck et al. |
| 2001/0022786 A1 | 9/2001 | King et al. |
| 2001/0025341 A1 | 9/2001 | Marshall |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0010684 A1 | 1/2002 | Moskowitz |
| 2002/0012443 A1 | 1/2002 | Rhoads et al. |
| 2002/0019769 A1 | 2/2002 | Barritz et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0078356 A1 | 6/2002 | Ezaki et al. |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168082 A1 * | 11/2002 | Razdan .................. 382/100 |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0032033 A1 * | 2/2003 | Anglin et al. .................. 435/6 |
| 2003/0033321 A1 | 2/2003 | Schrempp et al. |
| 2003/0037075 A1 | 2/2003 | Hannigan et al. |
| 2003/0051143 A1 * | 3/2003 | Razdan et al. .................. 713/176 |
| 2003/0053655 A1 | 3/2003 | Barone et al. |
| 2003/0056103 A1 * | 3/2003 | Levy et al. .................. 713/176 |
| 2003/0056213 A1 | 3/2003 | McFaddin et al. |
| 2003/0061489 A1 | 3/2003 | Pelly et al. |
| 2003/0063570 A1 | 4/2003 | Katayama et al. |
| 2003/0063747 A1 | 4/2003 | Petrovic |
| 2003/0070075 A1 | 4/2003 | Deguillaume et al. |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081780 A1 | 5/2003 | Kim |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |

(56) References Cited

U.S. PATENT DOCUMENTS

| | | |
|---|---|---|
| 2003/0179901 A1 | 9/2003 | Tian et al. |
| 2003/0185417 A1* | 10/2003 | Alattar et al. ............ 382/100 |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0191941 A1 | 10/2003 | Terada et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025023 A1 | 2/2004 | Yamada et al. |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0120544 A1 | 6/2004 | Eguchi et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2004/0260930 A1 | 12/2004 | Malik et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0063027 A1* | 3/2005 | Durst et al. ............ 359/2 |
| 2005/0071283 A1 | 3/2005 | Randle et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0177861 A1 | 8/2005 | Ma et al. |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2005/0267928 A1 | 12/2005 | Anderson et al. |
| 2006/0005029 A1 | 1/2006 | Petrovic et al. |
| 2006/0015927 A1* | 1/2006 | Antonellis et al. ............ 725/145 |
| 2006/0056653 A1 | 3/2006 | Kunisa |
| 2006/0062426 A1* | 3/2006 | Levy et al. ............ 382/100 |
| 2006/0075424 A1 | 4/2006 | Talstra et al. |
| 2006/0104477 A1 | 5/2006 | Isogai et al. |
| 2006/0156009 A1* | 7/2006 | Shin et al. ............ 713/176 |
| 2006/0190403 A1 | 8/2006 | Lin et al. |
| 2006/0218604 A1* | 9/2006 | Riedl et al. ............ 725/91 |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0064545 A1* | 3/2007 | Carson et al. ............ 369/14 |
| 2007/0100483 A1 | 5/2007 | Kentish et al. |
| 2007/0110237 A1* | 5/2007 | Tehranchi et al. ............ 380/201 |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1* | 1/2008 | Tehranchi et al. ............ 382/100 |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0219643 A1 | 9/2008 | Le Buhan et al. |
| 2008/0228733 A1 | 9/2008 | Davis et al. |
| 2008/0250240 A1 | 10/2008 | Celik et al. |
| 2008/0273861 A1 | 11/2008 | Yang et al. |
| 2008/0281448 A1 | 11/2008 | Uhrig et al. |
| 2008/0298632 A1 | 12/2008 | Reed |
| 2008/0301304 A1 | 12/2008 | Chitsaz et al. |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0100492 A1 | 4/2009 | Hicks, III et al. |
| 2009/0136082 A1 | 5/2009 | Zandifar et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0208008 A1 | 8/2009 | Lubin |
| 2009/0262932 A1 | 10/2009 | Petrovic |
| 2009/0268942 A1* | 10/2009 | Price ............ 382/103 |
| 2009/0319639 A1 | 12/2009 | Gao et al. |
| 2009/0326961 A1 | 12/2009 | Petrovic et al. |
| 2010/0011217 A1 | 1/2010 | Tachibana et al. |
| 2010/0023489 A1 | 1/2010 | Miyata et al. |
| 2010/0034513 A1 | 2/2010 | Nakano et al. |
| 2010/0069151 A1 | 3/2010 | Suchocki |
| 2010/0111355 A1 | 5/2010 | Petrovic et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1* | 9/2010 | Levy et al. ............ 382/100 |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2010/0332723 A1 | 12/2010 | Lin et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0185179 A1* | 7/2011 | Swaminathan et al. ...... 713/176 |
| 2011/0194727 A1 | 8/2011 | Guo et al. |
| 2011/0202687 A1 | 8/2011 | Glitsch et al. |
| 2011/0202844 A1 | 8/2011 | Davidson et al. |
| 2011/0209191 A1 | 8/2011 | Shah |
| 2011/0214044 A1 | 9/2011 | Davis et al. |
| 2011/0214143 A1 | 9/2011 | Rits et al. |
| 2011/0216936 A1 | 9/2011 | Reed et al. |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0255690 A1 | 10/2011 | Kocher et al. |
| 2011/0261667 A1* | 10/2011 | Ren et al. ............ 369/53.21 |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0023595 A1 | 1/2012 | Speare et al. |
| 2012/0026393 A1 | 2/2012 | Petrovic et al. |

(56) References Cited

U.S. PATENT DOCUMENTS

| | | | |
|---|---|---|---|
| 2012/0072729 A1* | 3/2012 | Winograd et al. | 713/176 |
| 2012/0072730 A1 | 3/2012 | Winograd et al. | |
| 2012/0072731 A1 | 3/2012 | Winograd et al. | |
| 2012/0084870 A1 | 4/2012 | Petrovic | |
| 2012/0122429 A1 | 5/2012 | Wood et al. | |
| 2012/0129547 A1 | 5/2012 | Andrews, III et al. | |
| 2012/0130719 A1 | 5/2012 | Petrovic et al. | |
| 2012/0203556 A1 | 8/2012 | Villette et al. | |
| 2012/0203734 A1 | 8/2012 | Spivack et al. | |
| 2012/0216236 A1 | 8/2012 | Robinson et al. | |
| 2012/0265735 A1 | 10/2012 | McMillan et al. | |
| 2012/0272012 A1 | 10/2012 | Aronovich et al. | |
| 2012/0272327 A1 | 10/2012 | Shin et al. | |
| 2012/0300975 A1 | 11/2012 | Chalamala et al. | |
| 2012/0300977 A1 | 11/2012 | Petrovic et al. | |
| 2012/0304206 A1 | 11/2012 | Roberts et al. | |
| 2012/0308071 A1 | 12/2012 | Ramsdell et al. | |
| 2013/0007462 A1 | 1/2013 | Petrovic et al. | |
| 2013/0011006 A1 | 1/2013 | Petrovic et al. | |
| 2013/0031579 A1 | 1/2013 | Klappert | |
| 2013/0060837 A1* | 3/2013 | Chakraborty et al. | 709/203 |
| 2013/0073065 A1 | 3/2013 | Chen et al. | |
| 2013/0108101 A1 | 5/2013 | Petrovic et al. | |
| 2013/0114847 A1 | 5/2013 | Petrovic et al. | |
| 2013/0114848 A1 | 5/2013 | Petrovic et al. | |
| 2013/0117570 A1 | 5/2013 | Petrovic et al. | |
| 2013/0117571 A1 | 5/2013 | Petrovic et al. | |
| 2013/0129303 A1 | 5/2013 | Lee et al. | |
| 2013/0132727 A1 | 5/2013 | Petrovic | |
| 2013/0142382 A1 | 6/2013 | Petrovic et al. | |
| 2013/0151855 A1* | 6/2013 | Petrovic et al. | 713/176 |
| 2013/0151856 A1* | 6/2013 | Petrovic et al. | 713/176 |
| 2013/0152210 A1* | 6/2013 | Petrovic et al. | 726/26 |
| 2013/0283402 A1 | 10/2013 | Petrovic | |
| 2013/0339029 A1 | 12/2013 | Petrovic et al. | |
| 2014/0029786 A1 | 1/2014 | Winograd | |
| 2014/0067950 A1 | 3/2014 | Winograd | |
| 2014/0071342 A1 | 3/2014 | Winograd et al. | |
| 2014/0074855 A1 | 3/2014 | Zhao et al. | |
| 2014/0075465 A1 | 3/2014 | Petrovic et al. | |
| 2014/0075466 A1 | 3/2014 | Zhao | |
| 2014/0075469 A1 | 3/2014 | Zhao | |
| 2014/0229963 A1 | 8/2014 | Petrovic et al. | |
| 2014/0237628 A1 | 8/2014 | Petrovic | |
| 2014/0267907 A1 | 9/2014 | Downes et al. | |
| 2014/0270337 A1 | 9/2014 | Zhao et al. | |
| 2014/0270338 A1 | 9/2014 | Zhao et al. | |
| 2014/0279296 A1 | 9/2014 | Petrovic et al. | |
| 2014/0279549 A1 | 9/2014 | Petrovic et al. | |
| 2014/0325550 A1 | 10/2014 | Winograd et al. | |
| 2014/0325673 A1 | 10/2014 | Petrovic | |
| 2014/0355817 A1 | 12/2014 | Wong et al. | |
| 2014/0376723 A1 | 12/2014 | Petrovic | |
| 2015/0016228 A1 | 1/2015 | Petrovic et al. | |
| 2015/0016663 A1 | 1/2015 | Tehranchi et al. | |
| 2015/0030200 A1 | 1/2015 | Petrovic et al. | |
| 2015/0121534 A1* | 4/2015 | Zhao et al. | 726/26 |

FOREIGN PATENT DOCUMENTS

| | | |
|---|---|---|
| CN | 1556987 | 12/2004 |
| CN | 101001354 | 7/2007 |
| EP | 282734 | 9/1988 |
| EP | 372601 | 6/1990 |
| EP | 581317 | 2/1994 |
| EP | 1137250 | 9/2001 |
| EP | 2166725 | 3/2010 |
| EP | 2605485 | 6/2013 |
| EP | 2653964 | 10/2013 |
| EP | 2782337 | 9/2014 |
| GB | 2260246 | 4/1993 |
| GB | 2292506 | 2/1996 |
| GB | 2358313 | 7/2001 |
| GB | 2363027 | 12/2001 |
| JP | 10-150548 | 6/1998 |
| JP | 11-086435 | 3/1999 |
| JP | 11-284516 | 10/1999 |
| JP | 11-346302 | 12/1999 |
| JP | 2000-069273 | 3/2000 |
| JP | 2000083159 | 3/2000 |
| JP | 2000-174628 | 6/2000 |
| JP | 2000163870 | 6/2000 |
| JP | 2000216981 | 8/2000 |
| JP | 2001022366 | 1/2001 |
| JP | 2001119555 | 4/2001 |
| JP | 2001175270 | 6/2001 |
| JP | 2001-188549 | 7/2001 |
| JP | 2001-216763 | 8/2001 |
| JP | 2001-218006 | 8/2001 |
| JP | 2001245132 | 9/2001 |
| JP | 2001257865 | 9/2001 |
| JP | 2001-312570 | 11/2001 |
| JP | 2001-527660 | 12/2001 |
| JP | 2001339700 | 12/2001 |
| JP | 2002-010057 | 1/2002 |
| JP | 2002-024095 | 1/2002 |
| JP | 2002-027223 | 1/2002 |
| JP | 2002-091465 | 3/2002 |
| JP | 2002091712 | 3/2002 |
| JP | 2002100116 | 4/2002 |
| JP | 2002125205 | 4/2002 |
| JP | 2002135557 | 5/2002 |
| JP | 2002-165191 | 6/2002 |
| JP | 2002176614 | 6/2002 |
| JP | 2002-519916 | 7/2002 |
| JP | 2002-232693 | 8/2002 |
| JP | 2002232412 | 8/2002 |
| JP | 2002319924 | 10/2002 |
| JP | 2002354232 | 12/2002 |
| JP | 2003-008873 | 1/2003 |
| JP | 2003-039770 | 2/2003 |
| JP | 2003-091927 | 3/2003 |
| JP | 2003134461 | 5/2003 |
| JP | 2003-230095 | 8/2003 |
| JP | 2003-244419 | 8/2003 |
| JP | 2003-283802 | 10/2003 |
| JP | 2003316556 | 11/2003 |
| JP | 2003348324 | 12/2003 |
| JP | 2004-023786 | 1/2004 |
| JP | 2004070606 | 3/2004 |
| JP | 2004-163855 | 6/2004 |
| JP | 2004173237 | 6/2004 |
| JP | 2004-193843 | 7/2004 |
| JP | 2004194233 | 7/2004 |
| JP | 2004-328747 | 11/2004 |
| JP | 2005051733 | 2/2005 |
| JP | 2005-094107 | 4/2005 |
| JP | 2005525600 | 8/2005 |
| JP | 20080539669 | 11/2008 |
| JP | 20100272920 | 12/2010 |
| JP | 5283732 | 7/2013 |
| KR | 1020080087047 | 9/2008 |
| KR | 20100009384 | 1/2010 |
| KR | 1020120128149 | 11/2012 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 0150665 | 7/2001 |
| WO | 01-55889 | 8/2001 |
| WO | 0197128 | 12/2001 |
| WO | 0213138 | 2/2002 |
| WO | 0219589 | 3/2002 |
| WO | 0223883 | 3/2002 |

(56) References Cited

FOREIGN PATENT DOCUMENTS

| WO | 0249363 | 6/2002 |
|---|---|---|
| WO | 02095727 | 11/2002 |
| WO | 03052598 | 6/2003 |
| WO | 03102947 | 12/2003 |
| WO | 2005017827 | 2/2005 |
| WO | 2005-027501 | 3/2005 |
| WO | 2005038778 | 4/2005 |
| WO | 2006051043 | 5/2006 |
| WO | 2006116394 | 11/2006 |
| WO | 2009031082 | 3/2009 |
| WO | 2010073236 | 7/2010 |
| WO | 2010135687 | 11/2010 |
| WO | 2011116309 | 9/2011 |
| WO | 2013067439 | 5/2013 |
| WO | 2013090462 | 6/2013 |
| WO | 2013090466 | 6/2013 |
| WO | 2013090467 | 6/2013 |
| WO | 2013163921 | 11/2013 |
| WO | 2014144101 | 9/2014 |
| WO | 2014153199 | 9/2014 |
| WO | 2014160324 | 10/2014 |
| WO | 2015013419 | 1/2015 |

OTHER PUBLICATIONS

"Civolution's 2nd screen synchronisation solution wins CSI product of the year 2011 award at IBC," IBC Press Release, Hall 2—Stand C30, Sep. 2011 (2 pages).
"Content Protection—Self Protecting Digital Content," http://www.cryptography.com/technology/spdc/index.html, May 2010 (1 page).
"Microsoft response to CfP for technology solutions to screen digital audio content for LCM acceptance," Microsoft Corporation, May 23, 1999 (9 pages).
"Red Bee and Civolution develop companion app for FX UK," http://www.digitaltveurope.net/19981/red-bee-and-civolution-develop-companion-app-for-fx-uk, Jan. 2012 (2 pages).
"Task AC122-copy protection for distribution services," Http://acad.bg/WISE/english/rd/partners/acts/areal/ac122-t.html, Jul. 1, 1997 (2 pages).
Adelsbach, A., et al., "Proving Ownership of Digital Content," Proc. 3rd Int. Workshop on Information Hiding, 1768:117-133, Sep. 1999.
Aggarwal, A., et al., "Multi-Layer Grid Embeddings," Foundations of Computer Science, 26th Annual Symposium on Foundations of Computer Science, 85:186-196, Oct. 1985.
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Barreto, P.S.L.M., et al. "Toward Secure Public-Key Blockwise Fragile Authentication Watermarking," IEEE Proceedings Vision, Image, and Signal Processing, 149(2):57-62, Apr. 2002.
Baudy, S., et al., "Estimation of geometric distortions in digital watermarking," IEEE International Conference on Watermarking, (2):885-888, Sep. 2002.
Boney, L., et al., "Digital Watermarks for Audio Signals," Dept. of Electrical Engineering, Univ. of Minnesota, Mar. 1996 (4 pages).
Cappellini, V., et al. "Robust Frame-based Watermarking for Digital Video," Proceedings of the 12th International Workshop on Database and Expert Systems Applications, Sep. 2001 (5 pages).
Caronni, G., "Assuring Ownership Rights for Digital; Images," Proceedings of reliable IT systems VIS 95, Vieweg Publishing Company, Germany, 1995 (10 pages).
Chen, B., et al., "Quantization index modulation: a class of provably good methods for digital watermarking and information embedding," IEEE Transactions on Information Theory, 47(4):1423-1443, May 2001.
Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).

Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages).; [http://www.cinea.com/whitepapers/forensic_watermarking.pdf].
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Das, et al., "Distributed Priority Queues on Hybercube Architectures," IEEE, 1996, pp. 620-627.
Davidson, M.F., "Music File Filter," Sony Music, New York, May 23, 1999 (2 pages).
Digimarc Corporation, "Digimarc Watermarking Guide," 1999 (22 pages).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.
European Search Report dated Apr. 12, 2012 for European Patent Application No. 07836262.1 filed Jul. 25, 2007 (12 pages).
European Search Report dated Jul. 3, 2012 for European Patent Application No. 12150742.0, filed Oct. 7, 2003 (5 pages).
European Search Report dated Nov. 10, 2010 for European Patent Application No. 03774648.4, filed Oct. 7, 2003 (5 pages).
European Search Report dated Nov. 8, 2012 for European Patent Application No. 06785709.4, filed Jun. 27, 2006 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
European Search Report dated Oct. 14, 2014 for European Patent Application No. 14173053.1, filed Oct. 7, 2003 (5 pages).
European Search Report dated Apr. 23, 2015 for European Patent Application No. 12846172.0, filed Nov. 2, 2012 (8 pages).
European Search Report dated May 28, 2015 for European Patent Application No. 11825990.2, filed Sep. 15, 2011 (6 pages).
European Search Report dated May 29, 2015 for European Patent Application No. 11825992.8 filed Sep. 15, 2011 (6 pages).
Furon, T., et al., "An asymmetric watermarking; method," IEEE Trans. Signal Processing, 4(51):981-995, Apr. 2003.
Guth, H.J., et al., "Error-and collusion-secure fingerprinting for digital data," Proc. 3rd Int. Workshop on Information Hiding, LNCS 1768:134-145, Sep./Oct. 1999.
Hartung, F., et al., "Digital watermarking of MPEG-2 coded video in the bitstream domain," Proc. IEEE Int. Conf. on Acoustics, Speech and Signal Processing, 4:2621-2624, Apr. 1997.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
Heegard, C., et al., "On the capacity of computer memory with defects," IEEE Trans. Info. Theory, 5(IT-29):731-739, Sep. 1983.
International Search Report and Written Opinion dated May 28, 2015 for International Application No. PCT/US2015/020282, filed Mar. 12, 2015 (7 pages).
International Search Report and Written Opinion dated May 1, 2015 for International Application No. PCT/US2014/052973, filed Aug. 27, 2014 (16 pages).
International Search Report and Written Opinion dated Sep. 12, 2014 for International Application No. PCT/US2014/035474, filed Apr. 25, 2014 (17 pages).

(56) References Cited

OTHER PUBLICATIONS

International Search Report and Written Opinion dated Sep. 15, 2014 for International Application No. PCT/US2014/035539, filed Apr. 25, 2014 (16 pages).
International Search Report and Written Opinion dated Apr. 24, 2012 for International Application No. PCT/US2011/051857, filed Sep. 15, 2011 (9 pages).
International Search Report and Written Opinion dated Apr. 8, 2013 for International Application No. PCT/US2012/069306, filed Dec. 12, 2012 (12 pages).
Office Action dated May 8, 2012 for Japanese Patent Application No. 2009-522802 (4 pages).
Office Action dated Nov. 26, 2012 for Japanese Patent Application No. 2011-114667 (8 pages).
Office Action dated Nov. 28, 2012 for Japanese Patent Application No. 2011-114666 (8 pages).
Office Action dated Oct. 30, 2014 for Korean Patent Application No. 10-2013-7009718 (8 pages).
Office Action dated Mar. 30, 2015 for Korean Patent Application No. 10-2014-7015220 (19 pages).
Office Action dated Feb. 3, 2015 for Chinese Patent Application No. 201180051678.7 (27 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind pattern: matching attack on watermark systems," IEEE Trans. Signal Processing, Apr. 2003 (4 pages).
Petitcolas, F.A.P., et al., "Attacks on copyright marking systems," Second Workshop on Information Hiding, Lecture Notes in Computer Science, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," http://www.tele.com/pipermail/tig/2003-November/003842.html, Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).
Seok, J., et al., "A novel audio watermarking algorithm for copyright protection of digital audio," ETRI Journal, 24(3):181-189, Jun. 2002.
Shih, F.Y., et al., "Combinational, image watermarking in the spatial and frequency domains," Pattern Recognition, 36:696-975, May 2002.
Solanki, K., et al., "Robust image-adaptive data hiding: modeling, source coding and channel coding", 41st Allerton Conference on Communications, Control and Computing, Oct. 2003 (10 pages).
Spangler, T., "Social Science," http://www.multichannel.com/content/social-science, Sep. 2011 (5 pages).
Steinebach, M., et al., "StirMark benchmark: audio watermarking attacks," International Conference on Information Technology: Coding and Computing (ITCC 2001), Las Vegas, Nevada, Apr. 2001 (6 pages).
Tanaka, K., et al., "Secret transmission method of character data in motion picture communication," SPIE Visual Communications and Image Processing '91, 1605:646-649, 1991.
Tsai, M.J., et al., "Wavelet packet and adaptive spatial transformation of watermark for digital image authentication," IEEE Image Processing, 2000 International Conference, 1:450-453, 2000 (4 pages).
Verance Corporation, "Confirmedia," PowerPoint presentation made to National Association of Broadcasters, Apr. 24, 2001 (40 pages).
Wang, H., "Communication-resource-aware adaptive watermarking for multimedia authentication in wireless multimedia sensor networks," J Supercomput, 64:883-897, 2013.
Wang, X, et al., "Robust correlation of encrypted attack traffic through stepping stones by manipulation of interpacket delays," Proceedings of the 10th ACM conference on computer communications security, Oct. 27-30, 2003, Washington D.C., USA.
Wolfgang, R., et al., "Perceptual watermarks for digital images and video," Proceedings of the IEEE, 87 (7):1108-1126, Jul. 1999.
Xu, C., et al., "Applications of digital watermarking technology in audio signals," Journal of Audio Eng. Soc., 10 (47):805-812, Oct. 1999.
Yeung, M. M., et al., "An invisible watermarking technique for image verification," Image Processing, International Conference Proceedings, 2:680-683, Oct. 26-29, 1997.
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
International Search Report and Written Opinion dated Aug. 14, 1998 for International Application No. PCT/US1998/009587, filed May 12, 1998 (3 pages).
International Search Report and Written Opinion dated Aug. 25, 2014 for International Application No. PCT/US2014/029564, filed Mar. 14, 2014 (10 pages).
International Search Report and Written Opinion dated Aug. 22, 2007 for International Application No. PCT/US2006/031267, filed Aug. 9, 2006 (2 pages).
International Search Report and Written Opinion dated Aug. 25, 2013 for International Application No. PCT/US2014/026322, filed Aug. 25, 2014 (12 pages).
International Search Report and Written Opinion dated Aug. 8, 2014 for International Application No. PCT/US2014/028372, filed Mar. 14, 2014 (18 pages).
International Search Report and Written Opinion dated Feb. 14, 2002 for International Application No. PCT/US2001/026505, filed Aug. 27, 2001 (2 pages).
International Search Report and Written Opinion dated Feb. 28, 2013 for International Application No. PCT/US2012/066138, filed Nov. 20, 2012 (11 pages).
International Search Report and Written Opinion dated Jan. 4, 2008 for International Application No. PCT/US2006/015615, filed Apr. 25, 2006 (5 pages).
International Search Report and Written Opinion dated Mar. 14, 2013 for International Application No. PCT/US2012/069308, filed Dec. 12, 2012 (10 pages).
International Search Report and Written Opinion dated Mar. 18, 2013 for International Application No. PCT/US2012/063431, filed Nov. 2, 2012 (10 pages).
International Search Report and Written Opinion dated Mar. 25, 2013 for International Application No. PCT/US2012/069302, filed Dec. 12, 2012 (22 pages).
International Search Report and Written Opinion dated Mar. 28, 2012 for International Application No. PCT/US2011/051855, filed Sep. 15, 2011 (8 pages).
International Search Report and Written Opinion dated May 13, 2008 for International Application No. PCT/US2006/025090, filed Jun. 27, 2006 (2 pages).
International Search Report and Written Opinion dated May 19, 2004 for International Application No. PCT/US2003/031816, filed Apr. 29, 2004 (3 pages).
International Search Report and Written Opinion dated May 29, 2008 for International Application No. PCT/US2006/015410, filed Apr. 21, 2006 (6 pages).
International Search Report and Written Opinion dated Sep. 26, 2008 for International Application No. PCT/US2007/016812, filed Jul. 25, 2007 (6 pages).
International Search Report and Written Opinion dated Nov. 11, 2014 for International Application No. PCT/US2014/047840, filed Jul. 23, 2014 (15 pages).
International Search Report and Written Opinion dated Feb. 25, 2015 for International Application No. PCT/US2014/041166, filed Jun. 5, 2014 (10 pages).
Jacobsmeyer, J., et al., "Introduction to error-control coding," Pericle Communications Company, 2004 (16 pages).

(56) References Cited

OTHER PUBLICATIONS

Kalker, T., et al., "A security risk for publicly available watermark detectors," Proc. Benelux Info. Theory Symp., Veldhoven, The Netherlands, May 1998 (7 pages).
Kalker, T., et al., "System issues in digital image and video watermarking for copy protection," Proc. IEEE Int. Conf. on Multimedia Computing and Systems, pp. 562-567, Jun. 1999.
Kang, X., et al., "A DWT-DFT composite watermarking scheme robust to both affine transform and JPEG compression," IEEE Transactions On Circuits and Systems for Video Technology, 8(13):776-786, Aug. 2003.
Kim, T.Y., et al., "An asymmetric watermarking system with many embedding watermarks corresponding to one detection watermark," IEEE Signal Processing Letters, 3(11):375-377, Mar. 2004.
Kirovski, D., et al., "Multimedia content screening using a dual watermarking and fingerprinting system," Proceedings of the tenth ACM international conference, pp. 372-381, 2002.
Kirovski, D., et al., "Randomizing the replacement attack," ICASSP, pp. 381-384, 2004.
Kirovski, D., et al., "Robust spread-spectrum audio watermarking," IEEE International Conference on Acoustics, Speech, and Signal Processing, 3:1345-1348, 2001.
Kirovski, D., et al., "Multimedia content screening using a dual watermarking and fingerprinting system," MULTIMEDIA '02 Proceedings of the tenth ACM international conference on Multimedia, 2002 (11 pages).
Kocher, P et al., "Self-Protecting Digital Content: A Technical Report from the CRI Content Security Research Initiative," Cryptography Research, Inc. (CRI), 2002-2003 (14 pages).
Kutter, M., et al., "The watermark copy attack," Proc. of the SPIE: Security and Watermarking of Multimedia Content II, 3971:1-10, Jan. 2000.
Kuznetsov, A.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Jan. 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional-and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):21-24, Jul. 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Miller, M.L. et al. "Computing the probability of false watermark detection," Published in the Proceedings of the Workshop on Information Hiding, Dresden, Germany, Sep. 29-Oct. 1, 1999.
Miller, M.L. et al. "Informed embedding: exploiting image and detector information during watermark insertion," IEEE Conference Publication, Image Processing, (3):1-4, Sep. 2000.
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking, " Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).
Office Action dated Dec. 29, 2014 for Chinese Patent Application No. 201180051690.8 (14 pages).
Office Action dated Jan. 20, 2014 for Japanese Patent Application No. 2013-036990 (6 pages).
Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated Mar. 18, 2011 for European Patent Application No. 03774648.4 (6 pages).
Office Action dated May 1, 2013 for Japanese Patent Application No. 2011-114667 (6 pages).

* cited by examiner

CONTENT MANAGEMENT USING MULTIPLE ABSTRACTION LAYERS

FIELD OF INVENTION

The present application generally relates to the field of content management. More particularly, the disclosed embodiments relate to using multiple layers to effectuate content management.

BACKGROUND

This section is intended to provide a background or context to the disclosed embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Watermarks are substantially imperceptible signals embedded into a host content. The host content may be any one of audio, still image, video or any other content that may be stored on a physical medium or transmitted or broadcast from one point to another. Watermarks are designed to carry auxiliary information without substantially affecting fidelity of the host content, or without interfering with normal usage of the host content. For this reason, watermarks are sometimes used to carry out covert communications, where the emphasis is on hiding the very presence of the hidden signals. Other widespread applications of watermarks include prevention of unauthorized usage (e.g., duplication, playing and dissemination) of copyrighted multi-media content, automatic content recognition (ACR), proof of ownership, authentication, tampering detection, content integrity verification, broadcast monitoring, transaction tracking, audience measurement, triggering of secondary activities such as interacting with software programs or hardware components, communicating auxiliary information about the content such as caption text, full title and artist name, or instructions on how to purchase the content. The above list of applications is not intended to be exhaustive, as many other present and future systems can benefit from co-channel transmission of main and auxiliary information.

In some applications of watermarks, such as content management applications, watermarks that are embedded in a host content must often be extracted in consumer products (e.g., DVD players, software media players, etc.) that access and use the content. These devices must interpret the information that is conveyed by such watermarks, and carry out the appropriate actions (e.g., enforcement actions) in conformance with the corresponding content use policies. Examples, of such actions include allowing full access to the content, preventing access to the content, allowing the playback of the content for a limited duration, allowing access to an abbreviated or degraded version of the content, etc. To provide a viable content management system, watermark extraction and subsequent operations in such widely available consumer products must be protected against potential attacks that are aimed at gaining unauthorized access to the content.

SUMMARY

The disclosed embodiments relate to systems, devices, methods and computer program products that improve various aspects of a content management system by utilizing multiple abstraction layers to conduct various content management operations.

One aspect of the disclosed embodiments relates to a method that includes accessing one or more contents at a content handling device. The content handling device is configured to operate using multiple abstraction layers including an application layer, an operating system layer, a firmware layer and a hardware layer. The method also includes conducting content management operations on the one or more contents using at least two abstraction layers. The content management operations include conducting watermark extraction and content screening operations at a first layer for a first watermark message having a first value, conducting watermark extraction and content screening operations at a second layer for a second watermark message having a second value, and initiating one or more enforcement actions corresponding to the first value and the second value based at least in-part on respective results of the content screening for the first watermark message and the content screening for the second watermark message.

In one exemplary embodiment, the one or more enforcement actions corresponding to content screening results for one or both of the first or second values are applied at the application layer. In another exemplary embodiment, each accessed content is provided to both the first and second layers. In yet another exemplary embodiment, where multiple contents are accessed by the content handling device, a first content is provided to the first layer; and a second content is provided to the second layer. According to another exemplary embodiment subsequent to initiating the one or more enforcement actions, the above noted method further includes receiving new usage rules associated with one or both of the first or the second values, and triggering a new enforcement action based on the new usage rules.

In another exemplary embodiment, the watermark extraction and content screening operations for the first watermark message are conducted at the hardware layer, and the watermark extraction and content screening operations for the second watermark message are conducted at the operating system layer. In an exemplary embodiment, the first value indicates that any content use at a consumer device is prohibited. In still another exemplary embodiment, the multiple abstraction layers further include a cloud computing layer. In yet another exemplary embodiment, the watermark extraction and content screening operations for one or both of the first or second watermark messages are triggered by a first application running at the application layer.

In one exemplary embodiment, the above noted method further includes receiving semantic information related to the one or more contents at one or both of the first or the second layers prior to conducting the watermark extraction and content screening operations at one or both of the first or the second layers. In a particular embodiment, the semantic information indicates one or more of the following: encryption status of the one or more contents, compression status of the one or more contents, encoding format of the one or more content, type of the one or more contents, or source of the one or more contents.

According to another exemplary embodiment, each of the watermark extraction and content screening operations at one or both of the first or second layers are conducted using respective software libraries that include program code stored on a tangible storage media, where the software libraries when linked to a software application program and executed by a microprocessor perform the watermark extraction and the content screening operations. In one exemplary embodiment, the above noted method further includes determining trustworthiness of the one or more software libraries based on a code signing technique. In another exemplary embodiment, the above noted method also includes determining trustworthiness of the one or more software libraries based on a shared secret between two or more abstraction layers. In yet another exemplary embodiment, the software libraries are available to more than one application at the applications layer.

In another exemplary embodiment, each of the first and the second layers includes an interface that allows secure communication of watermark extraction or content screening results to another layer. In yet another exemplary embodiment, the one or more enforcement actions include one or more of: stoppage of playback of the one or more contents, stoppage of recording of the one or more contents, stoppage of transfer of the one or more contents, muting an audio component of the one or more contents, blanking a video portion of the one or more contents, presenting a message on a screen of the content handling device, or presenting an advertisement on a screen of the content handling device.

Another aspect of the disclosed embodiments related to a device that includes a processor, and a memory comprising processor executable code. The processor executable code, when executed by the processor, configures the device to operate using multiple abstraction layers including an application layer, an operating system layer, a firmware layer and a hardware layer, access one or more contents, and conduct content management operations on the one or more contents using at least two abstraction layers. The content management operations include watermark extraction and content screening operations conducted at a first layer for a first watermark message having a first value, watermark extraction and content screening operations conducted at a second layer for a second watermark message having a second value, and initiation of one or more enforcement actions corresponding to the first value and the second value based at least in-part on respective results of the content screening for the first watermark message and the content screening for the second watermark message.

In one exemplary embodiment, the processor executable code, when executed by the processor, configures the device to provide each accessed content to both the first and second layers. In another exemplary embodiment, the processor executable code, when executed by the processor, configures the device to access multiple contents, provide a first content to the first layer, and provide a second content to the second layer. In yet another exemplary embodiment, the processor executable code, when executed by the processor, further configures the device to, subsequent to initiating the one or more enforcement actions, receive new usage rules associated with one or both of the first or the second values, and trigger a new enforcement action based on the new usage rules.

According to another exemplary embodiment, the processor executable code, when executed by the processor, further configures the device to receive semantic information related to the one or more contents at one or both of the first or the second layers prior to conducting the watermark extraction and content screening operations at one or both of the first or the second layers. In another exemplary embodiment, the processor executable code, when executed by the processor, configures the device to conduct each of the watermark extraction and content screening operations at one or both of the first or the second layers using respective software libraries that include program code stored on a tangible storage media, wherein the software libraries when linked to a software application program and executed by the processor perform the watermark extraction and the content screening operations.

Another aspect of the disclosed embodiments relates to a computer program product, embodied on one or more non-transitory computer readable media, that includes program code for accessing one or more contents at a content handling device, where the content handling device is configured to operate using multiple abstraction layers including an application layer, an operating system layer, a firmware layer and a hardware layer. The computer program product further includes program code for conducting content management operations on the one or more contents using at least two abstraction layers. Conducting the content management operations includes conducting watermark extraction and content screening operations at a first layer for a first watermark message having a first value, conducting watermark extraction and content screening operations at a second layer for a second watermark message having a first value, and initiating one or more enforcement actions corresponding to the first value and the second watermark value based at least in-part on respective results of the content screening for the first watermark message and the content screening for the second watermark message.

Another aspect of the disclosed embodiments relates to a method that includes accessing a content at a content handling device, where the content handling device is configured to operate using multiple abstraction layers in a hierarchical order such that each layer that is positioned at a lower level of hierarchy hides that layer's implementation details from all layers that are situated at a higher level of hierarchy with respect to that layer. Further, each layer includes an interface to allow communications between components operating within that layer and other layers of the multiple abstraction layers, where the multiple abstraction layers include an application layer, an operating system layer, a firmware layer and a hardware layer. Such a method further includes conducting content management operations using at least two abstraction layers. The content management operations include receiving semantic information related to the content at a first layer, subsequent to receiving the semantic information, conducting watermark extraction operations at the first layer based at least in-part on the received semantic information, communicating watermark extraction results from the first layer to a second layer through a secure interface, conducting content screening operations at the second layer based at least in-part on watermark extraction results, and initiating an enforcement action based at least in-part on a result of the content screening in conformance with a use policy of the content.

Another aspect of the disclosed embodiments related to a device that includes a processor, and a memory comprising processor executable code. The processor executable code, when executed by the processor, configures the device to operate using multiple abstraction layers in a hierarchical order such that each layer that is positioned at a lower level of hierarchy hides that layer's implementation details from all layers that are situated at a higher level of hierarchy with respect to that layer. Further, each layer includes an interface to allow communications between components operating within that layer and other layers of the multiple abstraction layers, where the multiple abstraction layers include an application layer, an operating system layer, a firmware layer and a hardware layer. The processor executable code, when executed by the processor, also configures the device to access a content, and conduct content management operations using at least two abstraction layers. The content management operations include reception of semantic information related to the content at a first layer, subsequent to reception of the semantic information, watermark extraction operations conducted at the first layer based at least in-part on the received semantic information, transmission of watermark extraction results from the first layer to a second layer through a secure interface, content screening operations conducted at the second layer based at least in-part on watermark extraction results, and initiation of an enforcement action based at least in-part on a result of the content screening in conformance with a use policy of the content.

Another aspect of the disclosed embodiments relates to a computer program product, embodied on one or more non-transitory computer readable media, that includes program code for accessing a content at a content handling device, where the content handling device is configured to operate using multiple abstraction layers in a hierarchical order such that each layer that is positioned at a lower level of hierarchy hides that layer's implementation details from all layers that are situated at a higher level of hierarchy with respect to that layer. Further, each layer includes an interface to allow communications between components operating within that layer and other layers of the multiple abstraction layers, where the multiple abstraction layers include an application layer, an operating system layer, a firmware layer and a hardware layer. The computer program product also includes program code for conducting content management operations using at least two abstraction layers. Such content management operations include receiving semantic information related to the content at a first layer, subsequent to receiving the semantic information, conducting watermark extraction operations at the first layer based at least in-part on the received semantic information, communicating watermark extraction results from the first layer to a second layer through a secure interface, conducting content screening operations at the second layer based at least in-part on watermark extraction results, and initiating an enforcement action based at least in-part on a result of the content screening in conformance with a use policy of the content.

Another aspect of the disclosed embodiments relates to a method that includes accessing a content at a content handling device, where the content handling device is configured to operate using multiple abstraction layers in a hierarchical order such that each layer that is positioned at a lower level of hierarchy hides that layer's implementation details from all layers that are situated at a higher level of hierarchy with respect to that layer. Further, each layer comprising an interface to allow communications between components operating within that layer and other layers of the multiple abstraction layers, where the multiple abstraction layers including an application layer, an operating system layer, a firmware layer and a hardware layer. Such a method further includes initiating content management operations. The content management operations includes receiving semantic information related to the content at a first layer, based at least in-part on the semantic information, determining whether or not to conduct content management operations, upon a determination to conduct content management operations, communicating the semantic information from the first layer to a second layer through a secure interface between the first layer and the second layer, conducting watermark extraction operations at the second layer based at least in-part on the received semantic information, communicating watermark extraction results from the second layer to a third layer through a secure interface between the second layer and the third layer, conducting content screening operations at the third layer based at least in-part on watermark extraction results, and initiating an enforcement action based at least in-part on a result of the content screening in conformance with a use policy of the content.

Another aspect of the disclosed embodiments relates to a device that includes a processor and a memory comprising processor executable code. The processor executable code, when executed by the processor, configures the device to access a content, the content handling device configured to operate using multiple abstraction layers in a hierarchical order such that each layer that is positioned at a lower level of hierarchy hides that layer's implementation details from all layers that are situated at a higher level of hierarchy with respect to that layer. Each layer comprising an interface to allow communications between components operating within that layer and other layers of the multiple abstraction layers, where the multiple abstraction layers including an application layer, an operating system layer, a firmware layer and a hardware layer. The processor executable code, when executed by the processor, further configures the device to initiate content management operations. The content management operations include reception of semantic information related to the content at a first layer, based at least in-part on the semantic information, determination of whether or not to conduct content management operations, upon a determination to conduct content management operations, communication of the semantic information from the first layer to a second layer through a secure interface between the first layer and the second layer, watermark extraction operations conducted at the second layer based at least in-part on the received semantic information, communication of watermark extraction results from the second layer to a third layer through a secure interface between the second layer and the third layer, content screening operations conducted at the third layer based at least in-part on watermark extraction results, and initiation of an enforcement action based at least in-part on a result of the content screening in conformance with a use policy of the content.

Another aspect of the disclosed embodiments relates to a computer program product, embodied on one or more non-transitory computer readable media, that includes program code for accessing a content at a content handling device, where the content handling device configured to operate using multiple abstraction layers in a hierarchical order such that each layer that is positioned at a lower level of hierarchy hides that layer's implementation details from all layers that are situated at a higher level of hierarchy with respect to that layer. Further, each layer includes an interface to allow communications between components operating within that layer and other layers of the multiple abstraction layers, where the multiple abstraction layers including an application layer, an operating system layer, a firmware layer and a hardware layer. The computer program product also includes program code for initiating content management operations. The content management operations include receiving semantic information related to the content at a first layer, based at least in-part on the semantic information, determining whether or not to conduct content management operations, upon a determination to conduct content management operations, communicating the semantic information from the first layer to a second layer through a secure interface between the first layer and the second layer, conducting watermark extraction operations at the second layer based at least in-part on the received semantic information, communicating watermark extraction results from the second layer to a third layer through a secure interface between the second layer and the third layer, conducting content screening operations at the third layer based at least in-part on watermark extraction results, and initiating an enforcement action based at least in-part on a result of the content screening in conformance with a use policy of the content.

DETAILED DESCRIPTION OF CERTAIN EMBODIMENTS

Figure 1:
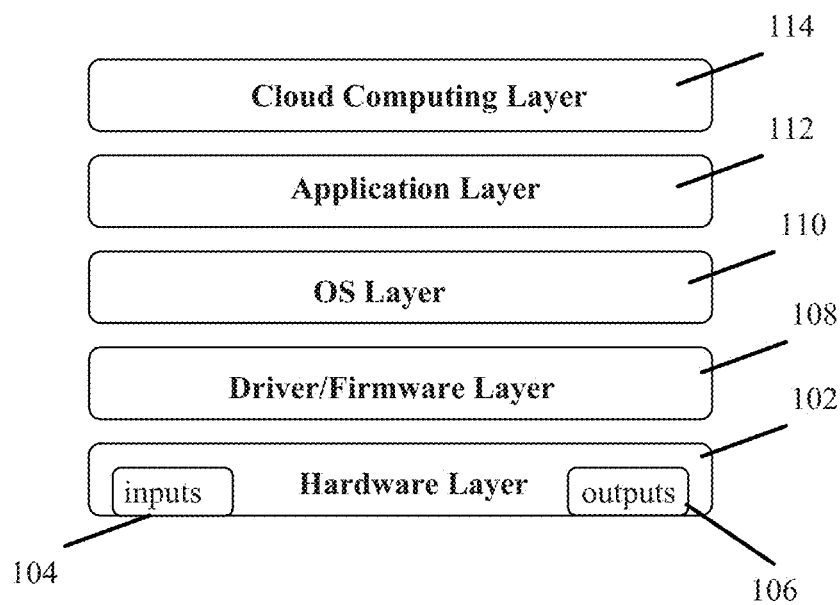
FIG. 1 illustrates abstraction layers in a computer system or a content handling device that accommodates cooperative content management in accordance with an exemplary embodiment.

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

In the context of the disclosed embodiments, the term watermark extraction is used to convey the operations that are carried out to detect and obtain the values of auxiliary information symbols (e.g., information bits) that are embedded in a host content as a watermark. A collection of such auxiliary symbols which can be independently detected from a host content is sometimes referred to a watermark payload. For example, a watermark payload can be a sequence of n symbols that comprises k symbols of auxiliary information and optionally n–k symbols of redundancy. The redundancy symbols provide error correction and/or error detection capability that may be used during the extraction of watermarks to correct erroneous symbols produced as a result of impairments. These impairments can be unintentional (e.g., due to transmission and storage of the host content) or intentional (e.g., due to post processing of the host content to effect compression, content format and resolution changes, attacks to modify or remove watermarks, etc.). Alternatively, the term watermark detection can be used instead watermark extraction. However, in some contexts, watermark detection may refer to the detection of the presence of watermarks rather than obtaining the values of the embedded auxiliary information. Further, watermark extraction does not refer to removing (e.g., erasing) an embedded watermark. In scenarios where removal of a watermark is to be carried out, the term watermark removal will be explicitly used.

The disclosed embodiments enable the implementation of a variety of watermark extraction technologies. By the way of example, and not by limitation, one watermark embedding procedure includes (1) obtaining a pre-defined number of digital content samples and (2) performing one or more filtering operations on the digital content samples. Such filtering operations can, for example, reduce the number of samples (i.e., a decimation operation) and/or serve to isolate a specific band of spatial or temporal frequencies. At step (3), a correlation operation is conducted. Such a correlation operation can a cross-correlation with a signal or a an auto-correlation with the same signal. At step (4), the results of the correlation is analyzed to ascertain whether or not a particular watermark symbol can be detected, and obtain the value of the symbol. At step (5), the individual symbols are formed into a packet and, if applicable, error correction code (ECC) or cyclic redundancy code (CRC) decoding is performed to detect and correct (to the extent possible) erroneous symbols in the packet. At step (6), a decision is made as to whether or not the packet represents a valid watermark packet and/or if additional packet processing must be performed to improve the reliability of packet detection. The above watermark extraction procedure can be repeated to extract watermarks that are embedded throughout the host content. The extracted watermark packet or watermark message can include one or more values that, for example, represent a copy control status, a content identification value, etc.

The above procedure can be modified or reconfigured to conform with the watermark extraction technology and parameters that are applicable to a particular content. U.S. Pat. Nos. 5,940,135, 6,427,012, 6,792,542, 7,460,667, and 5,636,292, the contents of which are herein incorporated by reference, further describe specific examples of watermark extraction procedures that can be implemented as part of watermark extraction operations described in this document.

In the context of the disclosed embodiments, screening and/or content screening refer to operations that are carried out to ascertain, based at least on the extracted watermark values, whether or not an intended use of a content, or an operation to be conducted with respect to the content, conforms to a content use policy. Through content screening it can be further ascertained as to which operation or operations can be carried out in conformance with the content use policies. The content use policy includes one or more rules governing the use of content, including, but not limited to, the conditions under which certain uses result in the taking of a specified action. The content use policy can also contain rules that do not control "usage" per se. For example, the content use policy can contain rules that report on the use of the content to a network server, or present an advertisement to the user, or take other actions. Further, content screening does not refer to the actual operation of playback of the content on a screen. As such, screening or content screening in the context of the disclosed embodiments should not be confused with the colloquial term "film screening," which refers to displaying of a motion picture or film on a movie screen in a special showing as part of a film's production and release cycle.

The disclosed embodiments enable the implementation of a variety of content screening procedures. By the way of example, and not by limitation, one content screening procedure includes (1) obtaining a value corresponding to an extracted watermark message and (2) comparing a value to a list of values obtained from a database. Such a list, which can be stored locally or can be communicated to the device that performs the content screening operations, also includes a listing of rule or rules that are mapped to each watermark value. Such rules, at least in-part, make up the content use policy. For example, a watermark value of "01" may be associated with the rule "no recording allowed." At step (3), it is determined if a match between the extracted watermark values within the list is obtained, and if so, at step (4) the corresponding rule(s) are obtained. At step (5), one or more actions are identified that conform to the content use policy. For example, while the rule associated with a "01" watermark may indicate that "no recording is allowed," such a content may be subject to additional restrictions or exceptions that are also part of the content use policy. For example, the content may be subject to an exception that allows the content to be recorded after a certain date, upon payment of a fee, etc. At step (6), the results of content screening are provided to the next module, entity or abstraction layer to effectuate a particular action. The above procedure can be modified or reconfigured to conform with the content screening technology and parameters that are applicable to a particular content.

Content screening results of the disclosed embodiments can be used to initiate, or otherwise direct, certain permissive, prohibitive, or auxiliary actions with regard to the usage of the content subject to screening, and/or other operations associated with that content. Examples of such actions include allowing unrestricted access to the content (i.e., an example of a permissive action), stopping playback of the content (i.e., an example of a prohibitive action), displaying of an advertisement (an example of an auxiliary action), etc. Sometimes such actions are referred to as "enforcement actions" to covey that such actions conform to, or enforce, the content use policy.

In the context of the disclosed embodiments, content management operations include at least watermark extraction, content screening and the corresponding enforcement actions. Examples of such enforcement actions include stoppage of playback, copying, streaming, downloading or uploading of the content, muting the audio, watching of advertisements, acquisition of rights to access the content, and display of message that explains the enforcement actions. Further, content management operations can be used to effectuate copy management or copyright management that relate to the enforcement of copyright rules with respect to a content.

As described above, watermarking is used to enable the communication and enactment of use policies for audiovisual content across a broad range of distribution channels and devices. In one example scenario, digital watermarks are used to communicate Copy Control Information (CCI) between a content provider and compliant consumer devices. Examples of CCI (sometime referred to as "CCI states," "watermark states" or "states") include Copy Once (i.e., a content with such a watermark would be allowed to be copied once), No More Copy (i.e., a content with such a watermark would not be allowed to be copied), No Home Use "NHU" (i.e. a content with such a watermark is intended for theatrical release only, and may be duplicated by professional replicators and played back on professional projection equipment only; thus such content would not be allowed for any use at a consumer or "home" setting), Trusted Source "TS" (i.e. a content with such a watermark is intended for use by consumers, but only if it is protected by a trusted digital rights management (DRM) technology). The CCI is embedded in the host content in such a way so that it remains within the host content as the host content is transmitted, stored, copied, converted to different formats, captured by a camcorder, or is subject to other transformations and processing.

The watermarked content is distributed through any means and may be ultimately accessed by devices that incorporate the appropriate watermark extraction and content screening capabilities. These capabilities enable retrieval of the embedded CCI that is used to obtain the corresponding content use policies and carry out any appropriate enforcement actions in conformance with those policies. The extracted CCI may, for example, indicate that the content is only intended for theatrical release and not for use in consumer devices, or that the content is intended for use only under the governance of certain content protection technologies.

In some embodiments, only one component of the content may be embedded with watermarks. For example, CCI watermarks can be embedded in an audio track of a movie, which allows devices such as Blu-ray Disc players obtain the CCI from the audio track and potentially limit the use of the movie according to the appropriate content use policies. For instance, depending on the type of extracted CCI, playback or copying of the movie may be stopped or the audio portion may be muted. When such actions are implemented, an explanatory message can also be provided on a display screen.

Content management systems that include CCI watermarks can be extended to include an Extended Payload (EP) to address broader needs of the content industry. For example, one use of the EP is to uniquely identify an instance or category of audiovisual content, and/or a channel, platform or region where the content is distributed. Content identification has emerged as a key technology to enable content monetization applications such as second screen content consumption (in which another content, such as advertisements, alternate content versions, additional information about the content, etc. are presented on a second screen simultaneously with the main content that is being presented on the main screen), cross media interaction, metadata enrichment, enhancement of engagement and discovery, and emerging market research and intelligence. In addition to prohibitive or restrictive responses such as stopping the playback of the content or muting the audio, enhanced responses can be introduced (e.g., based on the EP) to enable devices to provide more choices to the users for a wide range of targeted and customized products and services that are related to the content. For example, when playback of the content is stopped or the audio of the content is muted due to enforcement, the user may be offered to continue the playback from where the stoppage of playback or the muting of the audio occurred after paying a fee, watching advertisements, or other arrangements with content distributors.

FIG. 1 illustrates an example of multiple abstraction layers that can be used to cooperatively carry out content management operations, including watermark extraction, content screening and the corresponding enforcement actions, in accordance with an embodiment. The layers in FIG. 1 provide a hierarchical structure in which a lower layer hides the implementation details of a particular set of functionalities from its higher layer and provides a common interface to a higher layer to access and control its resources and functions. The abstraction layers of FIG. 1 can be implemented on a computer. In some embodiment, the abstraction layers of FIG. 1 are implemented in electronic devices such as smart phones, Blu-ray players, TVs, set-top boxes and other professional and consumer devices.

Referring back to FIG. 1, the hardware layer 102 includes one or more central processing units (CPUs), graphics processing units (GPUs) or peripheral devices. Some of the hardware functions can include graphic processing, sound rendering, and inputting and outputting of content and data through inputs 104 and outputs 106, respectively. The operating system (OS) in the OS layer 110 provides common services to the application layer 112. The application layer 112 includes software applications that are designed to help the user perform specific tasks and run on top of the OS layer 110. The driver/firmware layer 108 includes one or more drivers; each driver is a software program that controls a particular type of hardware. An operating system communicates and controls the hardware through the corresponding driver. The cloud computing layer 114 provides for the delivery of computing as a service rather than product. For example, the cloud computing layer 114 provides shared resources, software, and information to computers and other devices as a utility over a network.

Multiple abstraction layers can be further categorized as comprising trusted layers and untrusted layers in a user device. The trusted layers consistently behave in expected ways, and those behaviors are enforced by making resources such as processor, memory, input and output that are dedicated to trusted computing inaccessible to the non-trusted layers. For example, TrustZone technology divides the system into Trust World (the trusted layer) and Normal World (the untrusted layer). In another example, Trusted Platform Module (TPM) technology is a trusted layer including a secure hardware chip and trusted applications based on the secure chip.

When a multimedia content is received at, or retrieved by, a device, some or all of the abstraction layers may become involved in conducting various operations, such as retrieval of the content (e.g., a content file), decoding, rendering, playback and other operations as may be needed. In one illustrative scenario of content playback, a content file may be obtained from a local storage or networked location by the application layer 112, and flown downward through the OS layer 110, driver/firmware layer 104, hardware layer 102, to the output 106 that, for example, drives a speaker. Each layer performs a specific set of operations that include opening the file, decoding the contents of the file to produce "raw" data, provide graphic processing, sound rendering, mixing, equalization and other operations.

As more and more content, including legitimate, pirated, or user-generated content, is delivered from, uploaded to, stored, and managed in the cloud, it will become desirable to extend the content management operations from the user's device to the cloud. In one example, watermark extraction is performed in the cloud computing layer 114. In this example, one or more layers on the user's device securely receive the watermark extraction results along with the content from the cloud, and perform content screening and enforcement according to the extraction results. This example eliminates the need for the computationally expensive watermark extraction on the user device, which could be a burden for user devices such as mobile devices. In some example embodiments, watermark extraction may be performed at the cloud computing layer 114 and the extraction results can be stored in the cloud in advance of a request by a user device to access the content, thus improving the speed at which content management operations are carried out.

In another example of cloud storage services where the user can upload and share the content with other users, content management operations, including at least watermark extraction, content screening operations and enforcement, are performed at the content ingestion in the cloud computing layer 114 to ensure that the user has the rights to upload and/or access the content. In one example, content management operations can be performed at the cloud computing layer 114 before a content is delivered to any user. In another example, these operations may be performed only when the content is shared with a user other than the owner of the account in the cloud.

Depending on particular architecture, capabilities, and availability of resources in a device, all or a portion of content management operations can be carried out in any one of the abstraction layers. As noted earlier, these content management operations include watermark extraction, content screening and the associated enforcement actions.

In some embodiments, it is advantageous to perform watermark extraction and content screening operations at a lower layer within the abstraction layers for at least the following reasons. First, lower layers are less vulnerable to security attacks. For example, a hardware device at the hardware layer is generally considered more secure than a software that resides at an application layer. Second, watermark extraction and content screening, if conducted at a lower layer, can accommodate a wider range of content sources. For example, watermark extraction and content screening by a software application at the application layer can be carried out only on limited types of content (or content formats) that can be processed by that software application. However, these operations, if performed by the OS at the OS layer on a particular platform (e.g., a Microsoft Windows platform), may allow processing of all that is input to and output from the entire platform. Third, when watermark extraction requires decoded audio and/or video data, the lower layer (e.g., the hardware or firmware layer) often provides efficient audio/video decoding and other audio/video processing functions which are shared by the higher layers.

However, when content flows from a higher layer to a lower layer, the metadata and semantics of the content, such as its type and format and associated rights may be lost. For example, when a media player application decrypts a protected content and plays the decrypted content back, the OS may not be aware that such a content was originally encrypted and/or which content protection technology was used. At an even lower layer, such as the hardware layer, a sound card and a graphics card may not know the source of the content, that the audio and video portions of a content were originally compressed, and/or which compression codec and format were used since sound and graphics cards usually only receive and process uncompressed audio and video data.

In the absence of content management operations, the loss of metadata and semantic information does not affect playback or recording of a content since such information is not needed for rendering, graphics and sound processing and other operations that are carried out by various components within the corresponding abstraction layers. However, when implementing content management in such devices, the semantic information is critical to the layer that performs some or a portion of the content management operations. For example, if a content item is protected by an approved protection technology in a higher layer (e.g., an approved encryption scheme), watermark extraction and/or content screening at a lower layer may not be required for a content with "Trusted Source" CCI. In another example, the content from certain sources (e.g., Hulu.com, Netflix.com, payTV channels, etc.) may be completely exempt from watermark screening and content screening operations. The flow of metadata and sematic information may also need to take place from a lower layer to a higher layer. For example, when watermark extraction is performed at a lower layer, the lower layer may need to communicate the extraction results to a higher layer to enable content screening and/or enforcement to occur at the higher layer. Thus, it is essential for a higher layer to communicate, in a secure and trusted manner, such semantic information to a lower screening layer and for the lower layer to securely communicate watermark extraction results and/or the required enforcement actions with the upper layers. To this end, in some embodiments, the semantic information associated with a content is communicated to one or more abstraction layers that perform at least a portion of content management operations.

In some embodiments, content management operations are performed using two or more abstraction layers. In one example, one abstraction layer is responsible for watermark extraction, content screening and enforcement for one distinct CCI value, and another abstraction layer is responsible for watermark extraction, content screening and enforcement for another distinct CCI value. This approach reduces communications between layers and therefore reduces the security vulnerabilities that can be introduced by such communications. More importantly, it allows content management operations associated with a specific CCI to be implemented in a layer that can accommodate the screening and enforcement requirements for the CCI. In one example, "NHU" watermark extraction and content screening are performed at the OS layer to screen the content from all content sources in a consumer system because any content that contains an "NHU" is not intended for home entertainment in a consumer device, while those operations for the "TS" CCI are performed at the application layer to screen the content being processed by an application. Implementation of content management operations for the "TS" CCI in the application layer also allows a trusted application to skip watermark extraction and content screening when such trusted application only accepts legitimate content from trusted content sources. In some exemplary embodiments, any specific CCI is subject to watermark extraction and content screening in only one abstraction layer among the abstraction layers that are shown in FIG. 1.

In some exemplary embodiments, watermark extraction, content screening and the corresponding enforcement actions are separately performed in two or more distinct abstraction layers, regardless of the particular CCI value. For example, watermark extraction may be performed at the hardware layer (e.g., using audio/video decoding functions provided by system of chip (SOC) hardware) while content screening and the corresponding enforcement actions (e.g., stoppage of playback stop, muting of audio, and/or display of messages that explain the enforcement actions) are implemented using the application layer and/or the or OS layer. The benefits of such separations include allowing efficient and flexible implementation of content management operations in various platforms while achieving the appropriate security. In such embodiments, the metadata and semantic information can be communicated from one layer to another layer, along with the content, content screening results, enforcement message and/or watermark extraction results.

In some exemplary embodiments, watermark extraction, content screening and the corresponding enforcement actions are separately performed in different environments. For example, the watermark extraction, content screening and part of enforcement actions are performed in a trusted environment (e.g., in ARM's TrustZone, Microsoft's Protected Media Path, etc.), and part of enforcement actions such as stoppage of playback or copying and message display are performed in a non-trusted environment. In such embodiments, the metadata and semantic information can be communicated from one environment to another environment, along with content screening results, enforcement message and/or watermark extraction results.

In some exemplary embodiments, watermark extraction, content screening and the corresponding enforcement actions are implemented as software libraries or software programs that are linked with these software libraries statically at compile-time, or dynamically at run-time. When some content management operations are performed by such libraries (especially dynamically linked shared libraries) and some are performed by calling a program, integrity verification and authentication using code signing between the calling program and the shared libraries can be implemented required, as will be described in the sections that follow.

Security for cooperative content management using multiple layers: When content management operations are distributed over multiple layers or the semantic information is passed from one layer to another layer, potential vulnerabilities may be introduced that may allow an attacker to circumvent the implemented copy protection measures. Some examples of these security threats include (1) unauthorized access and/or manipulation of the communication of semantic information between layers; (2) man-in-middle attack between the layers, where an unauthorized entity, posing as an authorized entity, intercepts the results from one layer and modifies the results before transmitting them to the next layer; and (3) forgery or modification of the software components or firmware in the driver/firmware layer.

In some embodiments, code signing can be used to protect the software in the abstraction layers. Code signing can be used to sign and digitally "shrink wrap" executable software such as software objects, firmware images, Java applications, device drivers, and Microsoft Visual Basic for Applications (VBA) macros. Additionally, code signing can be used for static data, such as virus updates, configuration files or documents, and other forms of data that are transmitted over the network where the end user does not know the data publisher. Code signing meets the common security goals of authentication and integrity by providing (1) authentication of the publisher of the code (i.e., the publisher's true identity) and (2) proof of the code's integrity (i.e., that the code hasn't been tampered with subsequent to its creation).

In some embodiments, encryption is applied to ensure the confidentiality of the semantic information communicated between abstraction layers. Most modern Operating Systems such as Microsoft Windows Vista and Windows 7, MacOS, iOS and Android support code signing. A code signing solution can consist of the following processes.

Registration (perhaps annually): A software publisher provides identity information with a Certificate Authority (CA) for registration. The identity of the publisher is verified by the CA, and a PublisherID and a password are provided for access to CA's certification portal.

Certification: The publisher sends a public key to the CA. The CA signs the public key and returns the signature with other information (e.g., expiration data, revocation data, etc.). Such information forms a digital certificate.

Signing: The publisher creates a hash value from the software to be certified. The publisher uses the private key (which is paired with the public key that has been signed by a CA) to encrypt the hash value (i.e., the encrypted hash value becomes the signature). The publisher then distributes the software with the signature and the digital certificate.

Verification: The OS creates a hash value (h1) from the software. The OS verifies the digital certificate and obtains the verified publisher's public key. The OS uses the publisher's public key to decrypt the publisher's signature to obtain the hash value (h2) computed by the publisher. The OS then compares h1 and h2, and if they are identical, the verification succeeds.

A publisher, an OS provider or a third-party entity can be a CA. When a software publisher becomes a CA, the code signing becomes a self-certification code signing. Code signing may support hierarchical authentication based on standard protocols such X.509 Public Key Infrastructure.

With the code signing mechanism, if a higher layer needs to signal a particular lower layer as to whether the content should be subject to watermark extraction or content screening, the higher layer must be authenticated by that lower layer, or by another lower layer that is in turn authenticated by that particular lower layer. To ensure the chain of trust, the particular lower layer must be trusted, and authenticated by a trusted layer (such as a secure chip as root of the trust) in the device. Some examples of the technology which can be leveraged to build such a chain of trust based on the specific requirements of the disclosed embodiments include ARM's TrustZone based on secure silicon, Trusted Platform Modules, and Microsoft's Protected Environment.

Code Verification at runtime: The software signed with the code signing mechanism can be verified at installation or load time of the software. However, sophisticated attackers may be able to modify the loaded software in the memory and further change its behavior at runtime. To mitigate such attacks, code verification can be implemented at runtime to determine the integrity of the loaded code during the execution of the code. Advanced runtime verification can even detect the violations (or satisfactions) of correctness properties of the loaded software code.

In one embodiment, runtime verification of the signed code loaded in the memory is performed periodically. For example, when a signed application is loaded into a memory space of the application process, the OS can periodically verify the integrity of the memory to ensure no runtime modification has occurred. For improvement of runtime efficiency, checksums of some critical portions of the software code can be generated by the underlying OS when the code is loaded into memory for execution. During runtime, one or more portions of such loaded code may be randomly verified against the checksums produced at the load time. Furthermore, runtime behaviors of a software may be observed, analyzed, and verified by comparing one or a few execution traces with a predefined trace pattern provided by the software publishers.

In some embodiments, shared secrets can be used to protect software/firmware in the abstraction layers, alone or together with the code signing technique. A shared secret is a piece of data that is known only to the layers. Such a shared secret can be either hidden in the abstraction layers beforehand or generated at the start of or during the communications between layers based on cryptographic protocols. In the former case, such shared secrets are usually renewable through software/firmware updates and hidden in the obfuscated software codes when the layer is composed of software modules.

Shared secrets can also be used for integrity validation of the data exchanged between different layers against attacks such as replaying, tampering or forging such data. Techniques such as session tokens, cryptographic nonce, and timestamping can be used to counter these attacks. In some embodiments, shared secrets and functional logic in different abstraction layers are deliberately concealed using various software obfuscation techniques.

Obfuscation techniques transform signals or data to make their analysis or understanding difficult. For example, a software program can be transformed into another program that has equivalent behavior but makes the transformed program code and/or transformed program execution difficult to analyze against both dynamic and static reverse engineering and tampering attacks. Static reverse-engineering analysis techniques are applied on non-executing code and comprises static disassembling and subsequent static examination steps for the purposes of software piracy, extraction of hidden algorithms, secret keys, and other information embedded in the software. For example, static tampering techniques can modify a static binary image into another static binary image. Dynamic reverse-engineering analysis techniques are performed on code while being executed. For example, dynamic reverse engineering can involve tracing of executed instructions, register contents, dynamic data values, and function invocation sequences. That is, dynamic tampering techniques can modify an application at run-time.

Software obfuscation techniques can be used against both dynamic and static reverse engineering and tampering. For example, by renaming variables and functions, and breaking down structures, manual inspection and understanding of software logic against reverse-engineering can be thwarted. In another example, by encrypting software code and decrypting it only "on the fly" during its execution, static reverse-engineering and tampering attempts are thwarted. In yet another example, using hash codes generated from small code fragments of a software program and using a complex and nested network, these code fragments can verify each other's hash codes, as well as the program code itself, for integrity validation against tampering.

White-box cryptography is another technique to protect cryptographic keys and shared secrets hidden in software by constructing a cryptographic function that is resistant against a "white-box" attacker, who is able to observe every step of the cryptographic process. That is, in a "white box" attack, the attacker can freely observe dynamic code execution and internal algorithm details and alter code execution. However, despite such transparency, white box cryptography techniques conduct cryptographic operations without revealing the encryption/decryption keys.

Shared secrets can also be used for authentication between different layers based on a challenge-response authentication protocol in which one party presents a question ("challenge") and another party must provide a valid answer ("response"). For instance, the challenge can be an encrypted random integer N using the shared secret, while the response is the encrypted integer N+1 using the shared secret, proving that the other end was able to decrypt the integer N. In other variations, a value can be calculated from a hash function using a random number and the shared secret, instead of an encrypted random number, can be used in the authentication protocol.

In some embodiments, an advanced secret sharing scheme is employed in which a secret is divided into parts and each layer is given its own unique part in such a way that some of the parts or all of them are needed in order to reconstruct the secret. For instance, a secret can be distributed into Application, OS and Hardware layers. For each layer to authenticate itself to another layer based on a challenge-response protocol, it needs to collaborate with the third layer to reconstruct the secret. In another instance, the shared secret can only be reconstructed using the parts from all three layers.

Using the above described techniques, content management can be implemented in a system that includes both secure/trustworthy modules and components, as well as unsecure/not trust worthy modules and components. In particular, watermark extraction, content screening and enforcement operations can be carried out at different layers, where the corresponding results can be communicated between multiple layers through secure interfaces. One or more of the above described, and other, exemplary techniques, such as encryption, data authenticity and data integrity validation, obfuscation, use of security tokens, and white box cryptography can be used to implement and/or enhance the operation of such secure interfaces.

The disclosed embodiments further enable the adjustment of enforcement policy that is promulgated through an upper abstraction layer, while allowing watermark extraction and content screening to take place at either the upper abstraction layers, or alternatively, at a lower level. For example, changes in digital rights management policies can be securely signaled from an external source (e.g., a software update) to a software application to allow modifications to an existing enforcement policy. Such changes can update the enforcement actions that need to be triggered based on new content usage rules without a need to modify watermark extraction and at least a portion of content screening operations. In another example, the same watermark extraction module (e.g., operating at the OS layer) may be used to fulfill the needs of multiple applications running at the application layer, where each application conforms to a different set of content usage rules.

Figure 2:
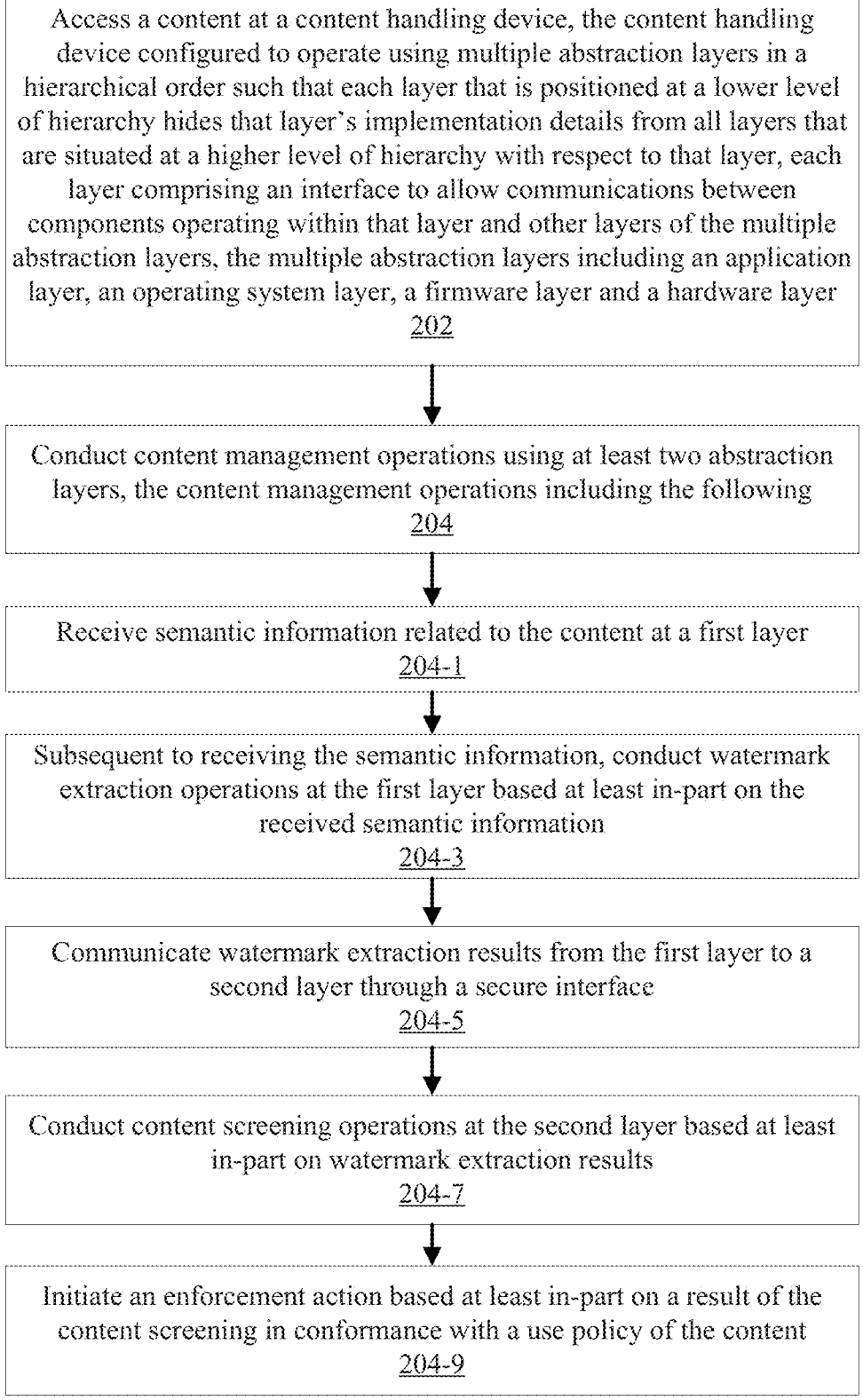
FIG. 2 illustrates a set of operations for conducting content management operations in accordance with an exemplary embodiment.

FIG. 2 illustrates a set of operations for conducting content management operations in accordance with an exemplary embodiment. At 202, a content is accessed at a content handling device, where the content handling device is configured to operate using multiple abstraction layers in a hierarchical order such that each layer that is positioned at a lower level of hierarchy hides that layer's implementation details from all layers that are situated at a higher level of hierarchy with respect to that layer. Further, each layer includes an interface to allow communications between components operating within that layer and other layers of the multiple abstraction layers. The multiple abstraction layers include an application layer, an operating system layer, a firmware layer and a hardware layer. At 204, content management operations are conducted using at least two abstraction layers. The content management operations include the following operations identified as 204-1 to 204-9. At 204-1, semantic information related to the content is received at a first layer. At 204-3, subsequent to receiving the semantic information, watermark extraction operations are conducted at the first layer based at least in-part on the received semantic information. At 204-5, watermark extraction results are communicated from the first layer to a second layer through a secure interface. At 204-7, content screening operations are conducted at the second layer based at least in-part on watermark extraction results. At 204-9 an enforcement action is initiated based at least in-part on a result of the content screening in conformance with a use policy of the content.

Figure 3:
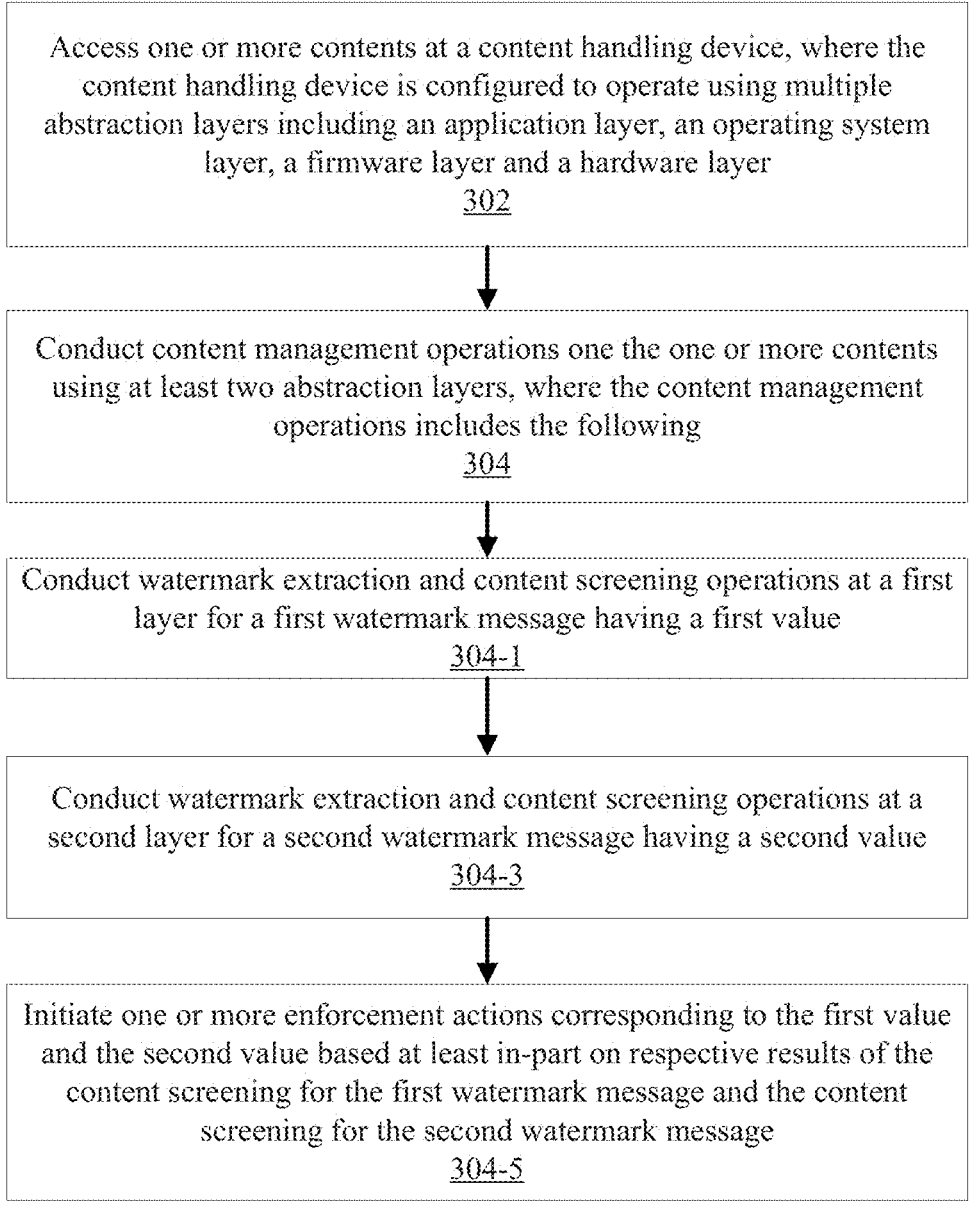
FIG. 3 illustrates a set of operations for conducting content management operations in accordance with another exemplary embodiment.

FIG. 3 illustrates a set of operations for conducting content management operations in accordance with another exemplary embodiment. At 302, one or more contents are accessed at a content handling device, where the content handling device is configured to operate using multiple abstraction layers including an application layer, an operating system layer, a firmware layer and a hardware layer. At 304, content management operations are conducted on the one or more contents using at least two abstraction layers, where conducting the content management operations includes the following operations identified as 304-1 to 304-5. At 304-1, watermark extraction and content screening operations are conducted at a first layer for a first watermark message having a first value. At 304-3, watermark extraction and content screening operations are conducted at a second layer for a second watermark message having a second value. At 304-5, one or more enforcement actions corresponding to the first value and the second value are initiated based at least in-part on respective results of the content screening for the first watermark message and the content screening for the second watermark message.

Figure 4:
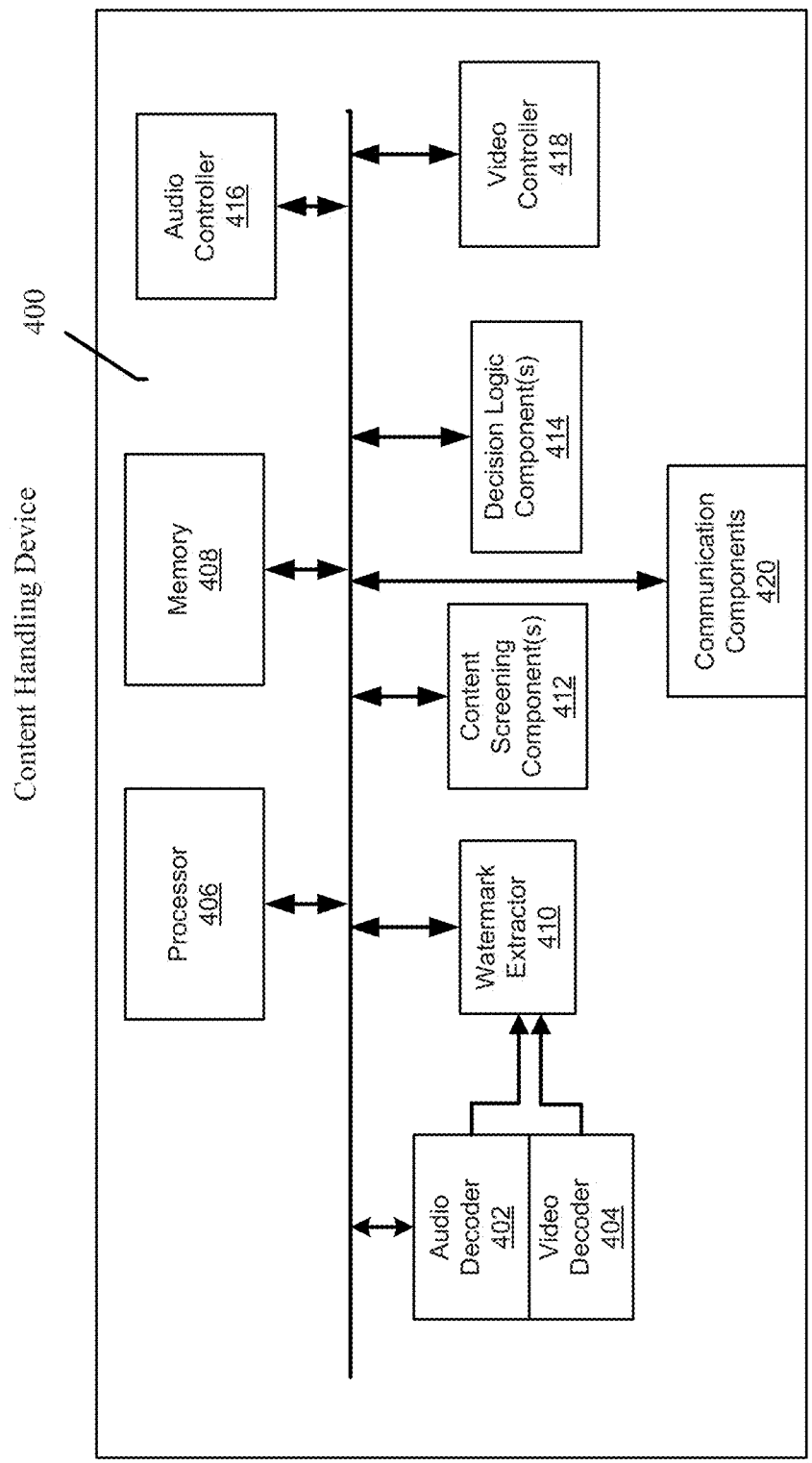
FIG. 4 illustrates an exemplary device that can be configured to operate in accordance with the disclosed embodiments.

FIG. 4 illustrates an exemplary device 400 that can be configured to operate in accordance with the disclosed embodiments. The device 400 includes communication components 420 through which multimedia content, as well as other information and signals, can be transmitted to and/or received from other components and entities. The communication components 420 may provide wired and/or wireless communication capabilities in accordance with one or more communication protocols and, therefore, the communication components 420 can include (or have access to) the appropriate transmitter and receiver circuitry (e.g., antenna, analog and digital components, etc.) that are needed to carry out the wired or wireless transmission of such signals. The audio decoder 402 and the video decoder 404 are configured to transform the received audio and video components of the multimedia content, respectively, so that such components can be subject to watermark extraction. In some embodiments, one or both of the audio and video components are encrypted and/or compressed. As such, in some embodiments, the audio decoder 402 and the video decoder 404 are equipped with decryption and/or decompression circuitry or components to decrypt and/or decompress the audio and video signals, respectively. In some embodiments, one or both of the decryption or decompression components (as well the components necessary to separate the audio and video components) are implemented as separate components within the device 400 (not shown). In still other embodiments, decryption and/or decompression of video and audio components (as well as the separation of components) can take place outside of the device 400.

Referring again to FIG. 4, the device 400 further includes a watermark extractor 410 that is configured to extract one or more watermarks from one or more components of the content (e.g., from video or audio components). The content screening components 412 are configured to conduct content screening. That is, to ascertain, based at least on the extracted watermark values, whether or not an intended use of the content, or an operation to be conducted with respect to the content, conforms to a content use policy. To this end, the content screening components 412 have access to content use policies associated with various watermark values. These content use policies can be stored within the device 400 at, for example, a portion of the memory 408. In some embodiments, the content use policies within the memory 408 can be updated to reflect changes in such policies. Additionally, or alternatively, such content use policies can be provided to the device 400 through a cloud and/or through a different device or entity.

The decision logic components 414 of FIG. 4 work in cooperation with other components of device 400 to trigger various enforcement actions in conformance with the content screening results. The audio controller 416 and video controller 418 control the audio and video signals, respectively, that are output from the device 400. For example, the audio controller 416 and/or the video controller 418 can be configured to stop or modify the output of audio and video signals, respectively, in accordance with the appropriate enforcement actions necessitated by the content screening results. The device 400 can also include at least one processor 406 (e.g. a microprocessor) that is in communication with the memory 408 and other components of the device 400. A portion of the memory 408 can include processor executable code, such as application and library codes, which when executed by the processor 406 can configure the device 400 to conduct content management operations. The processor 406 can further be used to, for example, coordinate the operations of other components within the device 400, initiate transfer of information and data from/to the device 400, and perform computations and the like. It should be noted that, for simplicity, FIG. 4 only depicts some of the components of the device 400, as well as only a subset of connectivities therein. However, it is understood that in accordance with the disclosed embodiments additional components and/or connections between components can exist that are not necessarily shown in the simplified diagram of FIG. 4.

The disclosed embodiments can be implemented using hardware devices that comprise particular physical components. For example, the devices of the present application can be implemented as an application specific integrated circuit (ASIC), as part of a field programmable gate array (FPGA), and/or using discrete digital and analog components and circuitry.

Figure 5:
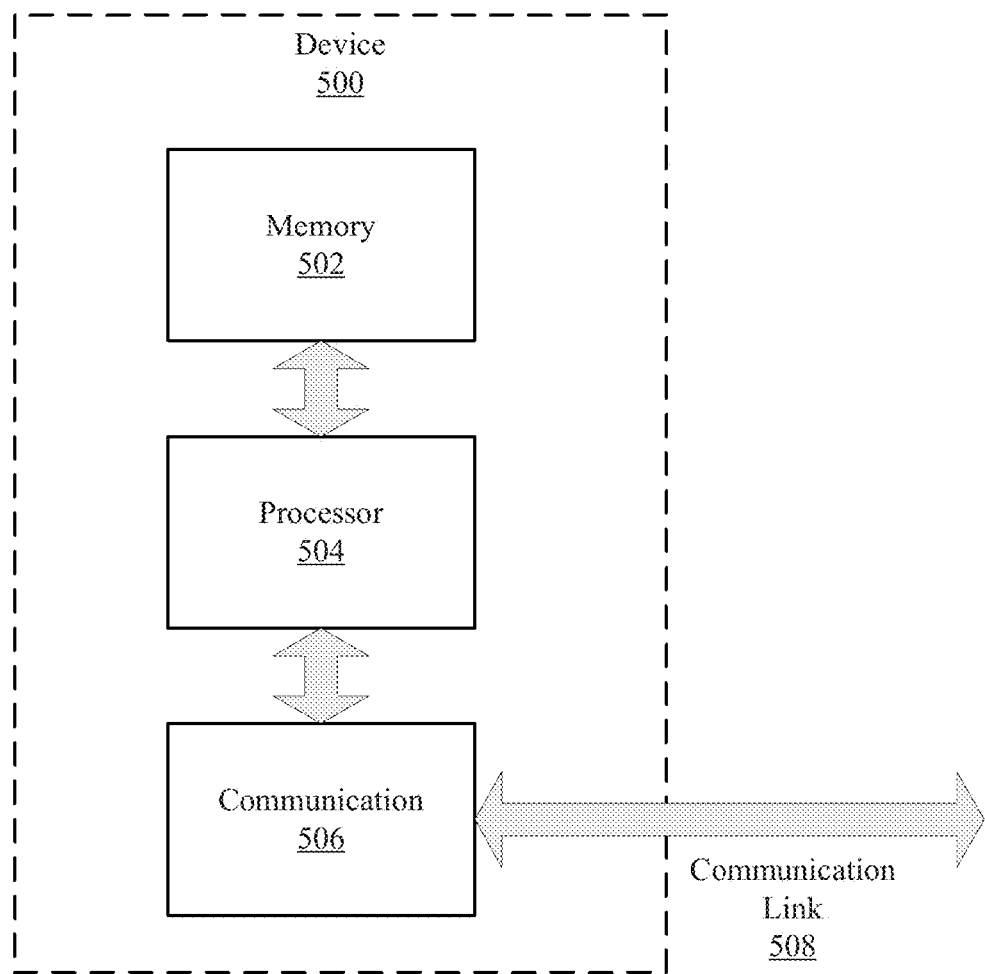
FIG. 5 illustrates a block diagram of another exemplary device that can be configured to implement some of the disclosed embodiments.

Certain aspects of the disclosed embodiments can be implemented as a device that includes a processor and a memory comprising processor executable code. The processor executable code, when executed by the processor, configures the device to perform any one of and/or all operations that are described in the present application. For example, FIG. 5 illustrates a block diagram of an exemplary device 500 that can be configured to implement some of the disclosed embodiments. The device 500 comprises at least one processor 504 (e.g., a microprocessor) and/or controller, at least one memory 502 unit that is in communication with the processor 504, and at least one communication unit 506 that enables the exchange of data and information, directly or indirectly, through the communication link 508 with other entities, devices, databases and networks. The communication unit 506 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 500 of FIG. 5 may be configured to implement the abstraction layers that are shown in FIG. 1.

Figure 6:
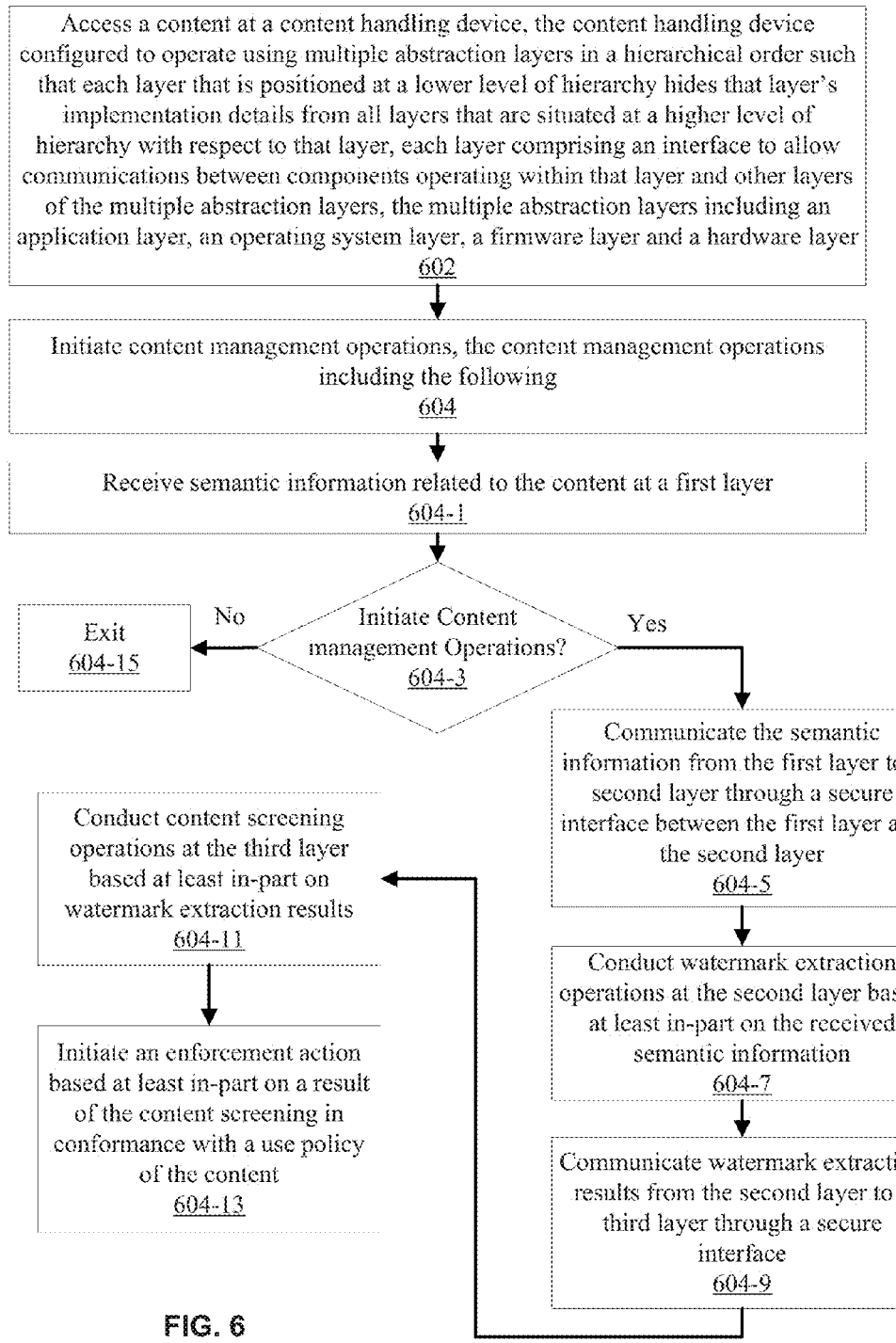
FIG. 6 illustrates a set of operations for conducting content management operations in accordance with another exemplary embodiment.

FIG. 6 illustrates a set of operations for conducting content management operations in accordance with an exemplary embodiment. At 602, a content is accessed at a content handling device, where the content handling device is configured to operate using multiple abstraction layers in a hierarchical order such that each layer that is positioned at a lower level of hierarchy hides that layer's implementation details from all layers that are situated at a higher level of hierarchy with respect to that layer. Further, each layer includes an interface to allow communications between components operating within that layer and other layers of the multiple abstraction layers. The multiple abstraction layers include an application layer, an operating system layer, a firmware layer and a hardware layer. At 604, content management operations are initiated that include the operations that are described at 604-1 to 604-15.

At 604-1, semantic information related to the content is received at a first layer. At 604-3, based at least in-part on the semantic information, it is determined whether or not to conduct content management operations. Upon a determination the conducting content management operations is not necessary, the operations exit at 604-15. As a consequence of such exit, the content may be allowed to, for example, be played back or recorded without restrictions. If, at 604-3, it is determined that content management operations are needed, the operations move to 604-5, where the semantic information is communicated from the first layer to a second layer through a secure interface between the first layer and the second layer. At 604-7, watermark extraction operations are conducted at the second layer based at least in-part on the received semantic information. At 640-9, watermark extraction results are communicated from the second layer to a third layer through a secure interface between the second layer and the third layer. At 604-11, content screening operations are conducted at the third layer based at least in-part on watermark extraction results, and at 604-13, an enforcement action is initiated based at least in-part on a result of the content screening in conformance with a use policy of the content.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
accessing one or more contents at a content handling device, the content handling device configured to operate using multiple abstraction layers including an application layer, an operating system layer, a firmware layer and a hardware layer, wherein the multiple abstraction layers are arranged in a hierarchical order such that each layer that is positioned at a lower level of hierarchy hides that layer's implementation details from all layers that are situated at a higher level of hierarchy with respect to that layer, the content handling device configured to receive a first content and provide at least a portion of the first content to a first layer of the multiple abstraction layers, and receive a second content and provide at least a portion of the second content to a second layer of the multiple abstraction layers; and conducting content management operations on the one or more contents using at least two of the multiple abstraction layers, wherein conducting the content management operations comprises:

conducting watermark extraction and content screening operations at the first layer for a first watermark message having a first value, the first value having an associated first usage rule or set of rules, conducting watermark extraction and content screening operations at the second layer for a second watermark message having a second value, the second value having an associated second usage rule or set of rules different from the first usage rule or set of rules and wherein the first usage rule or set of rules correspond to a more restrictive enforcement action than an enforcement action corresponding to the second usage rule or set of rules, and initiating one or more enforcement actions corresponding to the first value and the second value based at least in-part on respective results of the content screening for the first watermark message and the content screening for the second watermark message.

2. The method of claim 1, wherein the one or more enforcement actions corresponding to content screening results for one or both of the first or second values are applied at the application layer.

3. The method of claim 1, wherein each accessed content is provided to both the first and second layers.

4. The method of claim 1, wherein:
multiple contents are accessed by the content handling device;
the first content is provided to the first layer; and
the second content is provided to the second layer.

5. The method of claim 1, further comprising:
subsequent to initiating the one or more enforcement actions, receiving new usage rules associated with one or both of the first or the second values; and
triggering a new enforcement action based on the new usage rules.

6. The method of claim 1, wherein:
the watermark extraction and content screening operations for the first watermark message are conducted at the hardware layer; and
the watermark extraction and content screening operations for the second watermark message are conducted at the operating system layer.

7. The method of claim 6, wherein the first value indicates that any content use at a consumer device is prohibited.

8. The method of claim 1, wherein the multiple abstraction layers further include a cloud computing layer.

9. The method of claim 1, wherein the watermark extraction and content screening operations for one or both of the first or second watermark messages are triggered by a first application running at the application layer.

10. The method of claim 1, further comprising receiving semantic information related to the one or more contents at one or both of the first or the second layers prior to conducting the watermark extraction and content screening operations at one or both of the first or the second layers.

11. The method of claim 10, wherein the semantic information indicates one or more of the following:

encryption status of the one or more contents,
compression status of the one or more contents,
encoding format of the one or more content,
type of the one or more contents, or
source of the one or more contents.

12. The method of claim 1, wherein each of the watermark extraction and content screening operations at one or both of the first or second layers are conducted using respective software libraries that include program code stored on a tangible storage media, wherein the software libraries when linked to a software application program and executed by a microprocessor perform the watermark extraction and the content screening operations.

13. The method of claim 12, further comprising determining trustworthiness of the one or more software libraries based on a code signing technique.

14. The method of claim 12, further comprising determining trustworthiness of the one or more software libraries based on a shared secret between two or more abstraction layers.

15. The method of claim 12, wherein the software libraries are available to more than one application at the applications layer.

16. The method of claim 1, wherein each of the first and the second layers includes an interface that allows secure communication of watermark extraction or content screening results to another layer.

17. The method of claim 1, wherein the one or more enforcement actions include one or more of:
stoppage of playback of the one or more contents,
stoppage of recording of the one or more contents,
stoppage of transfer of the one or more contents,
muting an audio component of the one or more contents,
blanking a video portion of the one or more contents,
presenting a message on a screen of the content handling device, or
presenting an advertisement on a screen of the content handling device.

18. A device, comprising:
a processor; and
a memory comprising processor executable code, the processor executable code, when executed by the processor, configures the device to:
operate using multiple abstraction layers including an application layer, an operating system layer, a firmware layer and a hardware layer, wherein the multiple abstraction layers are arranged in a hierarchical order such that each layer that is positioned at a lower level of hierarchy hides that layer's implementation details from all layers that are situated at a higher level of hierarchy with respect to that layer,
access one or more contents including a first content and provide at least a portion of the first content to a first layer of the multiple abstraction layers, and a second content and provide at least a portion of the second content to a second layer of the multiple abstraction layers, and
conduct content management operations on the one or more contents using at least two of the multiple abstraction layers, wherein the content management operations comprise:
watermark extraction and content screening operations conducted at the first layer for a first watermark message having a first value, the first value having an associated first usage rule or set of rules,
watermark extraction and content screening operations conducted at the second layer for a second watermark message having a second value, the second value having an associated second usage rule or set of rules different from the first usage rule or set of rules and wherein the first usage rule or set of rules correspond to a more restrictive enforcement action than an enforcement action corresponding to the second usage rule or set of rules, and initiation of one or more enforcement actions corresponding to the first value and the second value based at least in-part on respective results of the content screening for the first watermark message and the content screening for the second watermark message.

19. The device of claim 18, wherein the one or more enforcement actions corresponding to content screening results for one or both of the first or second values are applied at the application layer.

20. The device of claim 18, wherein the processor executable code, when executed by the processor, configures the device to provide each accessed content to both the first and second layers.

21. The device of claim 18, wherein the processor executable code, when executed by the processor, configures the device to:
access multiple contents;
provide the first content to the first layer; and
provide the second content to the second layer.

22. The device of claim 18, the processor executable code, when executed by the processor, further configures the device to:
subsequent to initiating the one or more enforcement actions, receive new usage rules associated with one or both of the first or the second values; and
trigger a new enforcement action based on the new usage rules.

23. The device of claim 18, wherein:
the watermark extraction and content screening operations for the first watermark message are conducted at the hardware layer; and
the watermark extraction and content screening operations for the second watermark message are conducted at the operating system layer.

24. The device of claim 23, wherein the first value indicates that any content use at a consumer device is prohibited.

25. The device of claim 18, wherein the multiple abstraction layers further include a cloud computing layer.

26. The device of claim 18, wherein the watermark extraction and content screening operations for one or both of the first or second watermark messages are triggered by a first application running at the application layer.

27. The device of claim 18, wherein the processor executable code, when executed by the processor, further configures the device to receive semantic information related to the one or more contents at one or both of the first or the second layers prior to conducting the watermark extraction and content screening operations at one or both of the first or the second layers.

28. The device of claim 27, wherein the semantic information indicates one or more of the following:
encryption status of the one or more contents,
compression status of the one or more contents,
encoding format of the one or more content,
type of the one or more contents, or
source of the one or more contents.

29. The device of claim 18, wherein the processor executable code, when executed by the processor, configures the device to conduct each of the watermark extraction and content screening operations at one or both of the first or the second layers using respective software libraries that include program code stored on a tangible storage media, wherein the software libraries when linked to a software application program and executed by the processor perform the watermark extraction and the content screening operations.

30. The device of claim 29, wherein one or more the software libraries are singed using a code signing technique to allow determination of trustworthiness of the one or more software libraries.

31. The device of claim 29, wherein the processor executable code, when executed by the processor, configures the device to determine trustworthiness of the one or more software libraries based on a shared secret between two or more abstraction layers.

32. The device of claim 29, wherein the software libraries are available to more than one application at the applications layer.

33. The device of claim 18, wherein each of the first and the second layers includes an interface that allows secure communication of watermark extraction or content screening results to another layer.

34. The device of claim 18, wherein the one or more enforcement actions include one or more of:
stoppage of playback of the one or more contents,
stoppage of recording of the one or more contents,
stoppage of transfer of the one or more contents,
muting an audio component of the one or more contents,
blanking a video portion of the one or more contents,
presenting a message on a screen of the content handling device, or
presenting an advertisement on a screen of the content handling device.

35. A computer program product, embodied on one or more non-transitory computer readable media, comprising:
program code for accessing one or more contents at a content handling device, the content handling device configured to operate using multiple abstraction layers including an application layer, an operating system layer, a firmware layer and a hardware layer, wherein the multiple abstraction layers are arranged in a hierarchical order such that each layer that is positioned at a lower level of hierarchy hides that layer's implementation details from all layers that are situated at a higher level of hierarchy with respect to that layer, the content handling device configured to receive a first content and provide at least a portion of the first content to a first layer of the multiple abstraction layers, and receive a second content at provide at least a portion of the second content to a second layer of the multiple abstraction layers; and
program code for conducting content management operations on the one or more contents using at least two of the multiple abstraction layers, wherein conducting the content management operations comprises:
conducting watermark extraction and content screening operations at the first layer for a first watermark message having a first value, the first value having an associated first usage rule or set of rules,
conducting watermark extraction and content screening operations at the second layer for a second watermark message having a first value, the second value having an associated second usage rule or set of rules different from the first usage rule or set of rules and wherein the first usage rule or set of rules correspond to a more restrictive enforcement action than an enforcement action corresponding to the second usage rule or set of rules, and initiating one or more enforcement actions corresponding to the first value and the second watermark value based at least in-part on respective results of the content screening for the first watermark message and the content screening for the second watermark message.

36. A method, comprising:
accessing a content at a content handling device, the content handling device configured to operate using multiple abstraction layers in a hierarchical order such that each layer that is positioned at a lower level of hierarchy hides that layer's implementation details from all layers that are situated at a higher level of hierarchy with respect to that layer, each layer comprising an interface to allow communications between components operating within that layer and other layers of the multiple abstraction layers, the multiple abstraction layers including an application layer, an operating system layer, a firmware layer and a hardware layer; and
conducting content management operations using at least two of the multiple abstraction layers of the content handling device, the content management operations comprising:
receiving semantic information related to the content at a first layer, the semantic information indicative of at least a level trustworthiness of the content;
subsequent to receiving the semantic information, conducting watermark extraction operations at the first layer based at least in-part on the level of trustworthiness of the content determined from the received semantic information,
communicating watermark extraction results from the first layer to a second layer through a secure interface,
conducting content screening operations at the second layer based at least in-part on watermark extraction results, and
initiating an enforcement action based at least in-part on a result of the content screening in conformance with a use policy of the content.

37. The method of claim 36, wherein the semantic information indicates one or more of the following:
encryption status of the content,
compression status of the content,
encoding format of the content,
type of the content, or
source of the content.

38. A device, comprising:
a processor; and
a memory comprising processor executable code, the processor executable code, when executed by the processor, configures the device to:
operate using multiple abstraction layers in a hierarchical order such that each layer that is positioned at a lower level of hierarchy hides that layer's implementation details from all layers that are situated at a higher level of hierarchy with respect to that layer, each layer comprising an interface to allow communications between components operating within that layer and other layers of the multiple abstraction layers, the multiple abstraction layers including an application layer, an operating system layer, a firmware layer and a hardware layer;
access a content; and
conduct content management operations using at least two of the multiple abstraction layers, wherein the content management operations comprise:
reception of semantic information related to the content at a first layer, the semantic information indicative of at least a level trustworthiness of the content;
subsequent to reception of the semantic information, watermark extraction operations conducted at the first layer based at least in-part on the level of trustworthiness of the content determined from the received semantic information,
transmission of watermark extraction results from the first layer to a second layer through a secure interface,
content screening operations conducted at the second layer based at least in-part on watermark extraction results, and
initiation of an enforcement action based at least in-part on a result of the content screening in conformance with a use policy of the content.

39. A computer program product, embodied on one or more non-transitory computer readable media, comprising:
program code for accessing a content at a content handling device, the content handling device configured to operate using multiple abstraction layers in a hierarchical order such that each layer that is positioned at a lower level of hierarchy hides that layer's implementation details from all layers that are situated at a higher level of hierarchy with respect to that layer, each layer comprising an interface to allow communications between components operating within that layer and other layers of the multiple abstraction layers, the multiple abstraction layers including an application layer, an operating system layer, a firmware layer and a hardware layer; and
program code for conducting content management operations using at least two of the multiple abstraction layers, wherein the content management operations comprises:
receiving semantic information related to the content at a first layer, the semantic information indicative of at least a level trustworthiness of the content;
subsequent to receiving the semantic information, conducting watermark extraction operations at the first layer based at least in-part on the level of trustworthiness of the content determined from the received semantic information,
communicating watermark extraction results from the first layer to a second layer through a secure interface,
conducting content screening operations at the second layer based at least in-part on watermark extraction results, and
initiating an enforcement action based at least in-part on a result of the content screening in conformance with a use policy of the content.

40. A method, comprising:
accessing a content at a content handling device, the content handling device configured to operate using multiple abstraction layers in a hierarchical order such that each layer that is positioned at a lower level of hierarchy hides that layer's implementation details from all layers that are situated at a higher level of hierarchy with respect to that layer, each layer comprising an interface to allow communications between components operating within that layer and other layers of the multiple abstraction layers, the multiple abstraction layers including an application layer, an operating system layer, a firmware layer and a hardware layer; and
initiating content management operations, the content management operations comprising:
receiving semantic information related to the content at a first layer, the semantic information indicative of at least a level trustworthiness of the content, based at least in-part on the level of trustworthiness of the content determined from the semantic information, determining whether or not to conduct content management operations, upon a determination to conduct content management operations, communicating the semantic information from the first layer to a second layer through a secure interface between the first layer and the second layer, conducting watermark extraction operations at the second layer based at least in-part on the received semantic information, communicating watermark extraction results from the second layer to a third layer through a secure interface between the second layer and the third layer, conducting content screening operations at the third layer based at least in-part on watermark extraction results, and initiating an enforcement action based at least in-part on a result of the content screening in conformance with a use policy of the content.

41. A device, comprising:

a processor; and a memory comprising processor executable code, the processor executable code, when executed by the processor, configures the device to:

access a content, the content handling device configured to operate using multiple abstraction layers in a hierarchical order such that each layer that is positioned at a lower level of hierarchy hides that layer's implementation details from all layers that are situated at a higher level of hierarchy with respect to that layer, each layer comprising an interface to allow communications between components operating within that layer and other layers of the multiple abstraction layers, the multiple abstraction layers including an application layer, an operating system layer, a firmware layer and a hardware layer; and initiate content management operations, wherein the content management operations comprise:

reception of semantic information related to the content at a first layer, the semantic information indicative of at least a level trustworthiness of the content, based at least in-part on the level of trustworthiness of the content determined from the semantic information, determination of whether or not to conduct content management operations, upon a determination to conduct content management operations, communication of the semantic information from the first layer to a second layer through a secure interface between the first layer and the second layer, watermark extraction operations conducted at the second layer based at least in-part on the received semantic information, communication of watermark extraction results from the second layer to a third layer through a secure interface between the second layer and the third layer, content screening operations conducted at the third layer based at least in-part on watermark extraction results, and initiation of an enforcement action based at least in-part on a result of the content screening in conformance with a use policy of the content.

42. A computer program product, embodied on one or more non-transitory computer readable media, comprising:

program code for accessing a content at a content handling device, the content handling device configured to operate using multiple abstraction layers in a hierarchical order such that each layer that is positioned at a lower level of hierarchy hides that layer's implementation details from all layers that are situated at a higher level of hierarchy with respect to that layer, each layer comprising an interface to allow communications between components operating within that layer and other layers of the multiple abstraction layers, the multiple abstraction layers including an application layer, an operating system layer, a firmware layer and a hardware layer; and program code for initiating content management operations, the content management operations comprising:

receiving semantic information related to the content at a first layer, the semantic information indicative of at least a level trustworthiness of the content, based at least in-part on the level of trustworthiness of the content determined from the semantic information, determining whether or not to conduct content management operation, upon a determination to conduct content management operations, communicating the semantic information from the first layer to a second layer through a secure interface between the first layer and the second layer, conducting watermark extraction operations at the second layer based at least in-part on the received semantic information, communicating watermark extraction results from the second layer to a third layer through a secure interface between the second layer and the third layer, conducting content screening operations at the third layer based at least in-part on watermark extraction results, and initiating an enforcement action based at least in-part on a result of the content screening in conformance with a use policy of the content.

43. The method of claim 36, wherein the watermark extraction results are communicated from the first layer to the second layer upon a determination of trustworthiness of the second layer.

44. The method of claim 36, wherein the content screening operations comprise using a watermark value obtained from the watermark extraction results to determine a content use policy associated with the content.

45. The method of claim 44, wherein the content use policy is indicative of one of the following:

usage of the content at a consumer home setting is prohibited;

recording of the content is prohibited;

access to the content is allowed after a particular date; or access to the content is allowed upon a determination that the content is a trusted source.

46. The method of claim 45, determination that the content is a trusted source comprises determining whether or not the content is protected by a trusted digital rights management (DRM) technology.

47. The method of claim 36, wherein the watermark extraction and content screening operations are carried out according to one of the following configurations:

the watermark extraction operations are conducted at the hardware layer, and the content screening operations are conducted at the operating system layer;

the watermark extraction operations are conducted at the operating system layer, and the content screening operations are conducted at the application layer; or the watermark extraction operations are conducted at the hardware layer, and the content screening operations are conducted at the application layer.

48. The method of claim 36, wherein the enforcement action includes one or more of: presenting a message on a screen of the content handling device, or presenting an advertisement on a screen of the content handling device.

49. The device of claim 38, wherein the watermark extraction results are communicated from the first layer to the second layer upon a determination of trustworthiness of the second layer.

50. The device of claim 38, wherein the content screening operations comprise using a watermark value obtained from the watermark extraction results to determine a content use policy associated with the content.

51. The device of claim 50, wherein the content use policy is indicative of one of the following:
   usage of the content at a consumer home setting is prohibited;
   recording of the content is prohibited;
   access to the content is allowed after a particular date; or
   access to the content is allowed upon a determination that the content is a trusted source.

52. The device of claim 51, determination that the content is a trusted source comprises determining whether or not the content is protected by a trusted digital rights management (DRM) technology.

53. The device of claim 38, wherein the watermark extraction and content screening operations are carried out according to one of the following configurations:
   the watermark extraction operations are conducted at the hardware layer, and the content screening operations are conducted at the operating system layer;
   the watermark extraction operations are conducted at the operating system layer, and the content screening operations are conducted at the application layer; or
   the watermark extraction operations are conducted at the hardware layer, and the content screening operations are conducted at the application layer.

54. The device of claim 38, wherein enforcement action includes one or more of: presenting a message on a screen of the content handling device, or presenting an advertisement on a screen of the content handling device.

55. The device of claim 38, wherein the semantic information indicates one or more of the following:
   encryption status of the content,
   compression status of the content,
   encoding format of the content,
   type of the content, or
   source of the content.

* * * * *